US012786954B2

(12) United States Patent
Li

(10) Patent No.: US 12,786,954 B2
(45) Date of Patent: Nov. 3, 2026

(54) METHOD AND APPARATUS FOR PAGING MONITORING, COMMUNICATION DEVICE AND STORAGE MEDIUM

(71) Applicant: Beijing Xiaomi Mobile Software Co., Ltd., Beijing (CN)

(72) Inventor: Yanhua Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 317 days.

(21) Appl. No.: 18/688,952

(22) PCT Filed: Sep. 6, 2021

(86) PCT No.: PCT/CN2021/116779
§ 371 (c)(1),
(2) Date: Mar. 4, 2024

(87) PCT Pub. No.: WO2023/029051
PCT Pub. Date: Mar. 9, 2023

(65) Prior Publication Data
US 2025/0008485 A1 Jan. 2, 2025

(51) Int. Cl.
*H04W 68/02* (2009.01)
*H04W 24/08* (2009.01)
*H04W 76/28* (2018.01)

(52) U.S. Cl.
CPC ........... *H04W 68/02* (2013.01); *H04W 24/08* (2013.01); *H04W 76/28* (2018.02)

(58) Field of Classification Search
CPC ... H04W 68/02; H04W 68/00; H04W 68/005; H04W 24/08; H04W 76/28; H04W 76/27; H04W 52/02; H04W 52/0216; H04W 52/0225; Y02D 30/70
See application file for complete search history.

(56) References Cited

U.S. PATENT DOCUMENTS

2019/0223147 A1* 7/2019 Chen .................... H04W 68/02

FOREIGN PATENT DOCUMENTS

CN 107637163 A 1/2018
CN 109792793 A 5/2019
(Continued)

OTHER PUBLICATIONS

Ericsson, Details of eDRX and PTW in RRC_Idle and RRC Inactive, Aug. 9-27, 2021, 3GPP TSG-RAN WG2 #115-e, Tdoc R2-2108280, pp. 1-7 (Year: 2021).*
(Continued)

*Primary Examiner* — Farid Seyedvosoghi
(74) *Attorney, Agent, or Firm* — Finnegan, Henderson, Farabow, Garrett & Dunner, L.L.P.

(57) ABSTRACT

A method for paging monitoring is performed by a terminal. The method includes: determining, according to a determination result of whether a cell where the terminal in a radio resource control (RRC) unconnected state resides supports an enhanced discontinuous reception (eDRX) in the RRC unconnected state, a paging cycle for the terminal in the RRC unconnected state to perform a paging monitoring in the cell; wherein the terminal is pre-configured with an eDRX parameter for performing the paging monitoring based on the eDRX in the RRC unconnected state.

20 Claims, 7 Drawing Sheets

(56) References Cited

FOREIGN PATENT DOCUMENTS

| | | | |
|---|---|---|---|
| CN | 113170389 | A | 7/2021 |
| WO | WO 2020118726 | A1 | 6/2020 |

OTHER PUBLICATIONS

Office Action for SG Application No. 11202401491R dated Oct. 2, 2025.
Ericsson, "Details of eDRX and PTW in RRC_Idle and RRC_ Inactive", Tdoc R2-2108280, 3GPP TSG-RAN WG2 #115-e, Electronic meeting, Aug. 9-27, 2021.
International Search Report and Written Opinion of International Application No. PCT/CN2021/116779, dated May 30, 2022, 12 pages.
"On eDRX for NR RRC Inactive and Idle", CATT, 3GPP TSG-RAN WG2 Meeting #112 electronic, R2-2009363, Online, Nov. 2-13, 2020, 3 pages.
The First Office Action issued by the State Intellectual Property Office of People's Republic of China on Jul. 12, 2025, in corresponding Application No. CN 202310659211.5, 18 pages.
Extended European Search Report Issued in Application No. 21955582.8 dated Sep. 18, 2025, 107 pages.
Office Action for Russian Patent Application No. 2024106560/07, dated Sep. 26, 2024, 12 pages.

* cited by examiner

METHOD AND APPARATUS FOR PAGING MONITORING, COMMUNICATION DEVICE AND STORAGE MEDIUM

CROSS-REFERENCE TO RELATED APPLICATION

This application is a U.S. national phase application of International Application No. PCT/CN2021/116779, filed Sep. 6, 2021, the entire contents of which are incorporated herein by reference.

TECHNICAL FIELD

The present disclosure relates to, but is not limited to, the technical field of wireless communication, and more particularly to a method and apparatus for paging monitoring, a communication device and a storage media.

BACKGROUND

In the communication technology, a terminal can take into account services that have certain requirements on power consumption and delay. In each enhanced discontinuous reception (eDRX) cycle, the terminal receives downlink data only within a set paging time window (PTW), and for the rest of the time, the terminal is in a dormant state and does not receive downlink data. The manner of the eDRX can achieve a balance between the delay and the power consumption in downlink services.

In related art, a terminal may move between different cells, and there exist cells that do not support the eDRX. When the terminal moves to a cell that does not support the eDRX, a paging monitoring failure may occur, resulting in poor reliability of the wireless communication.

SUMMARY

According to embodiments of the present disclosure, there is provided a method for paging monitoring, which is performed by a terminal and includes: determining, according to a determination result of whether a cell where the terminal in a radio resource control (RRC) unconnected state resides supports an enhanced discontinuous reception (eDRX) in the RRC unconnected state, a paging cycle for the terminal in the RRC unconnected state to perform a paging monitoring in the cell. The terminal is pre-configured with an eDRX parameter for performing the paging monitoring based on the eDRX in the RRC unconnected state.

According to embodiments of the present disclosure, there is provided a communication device, which includes: a processor, and a memory for storing instructions executable by the processor. The processor is configured to implement the method as described in any embodiment of the present disclosure.

According to embodiments of the present disclosure, there is provided a non-transitory computer readable storage medium having stored therein computer-executable programs that, when executed by a processor, enable the method as described in any embodiment of the present disclosure to be implemented.

DETAILED DESCRIPTION

Reference will now be made in detail to illustrative embodiments, examples of which are illustrated in the accompanying drawings. The following description refers to the accompanying drawings in which the same numbers in different drawings represent the same or similar elements unless otherwise represented. The implementations set forth in the following description of illustrative embodiments do not represent all implementations consistent with embodiments of the present disclosure. Instead, they are merely examples of apparatuses and methods consistent with some aspects of the present disclosure as recited in the appended claims.

Terms used in embodiments of the present disclosure are only for the purpose of describing specific embodiments, but should not be construed to limit the present disclosure. As used in embodiments of the present disclosure and the appended claims, "a/an", and "the" in singular forms are intended to include plural forms, unless clearly indicated in the context otherwise. It should also be understood that, the term "and/or" used herein represents and contains any or all possible combinations of one or more associated listed items.

It should be understood that, although terms such as "first," "second" and "third" may be used in embodiments of the present disclosure for describing various information, these information should not be limited by these terms. These terms are only used for distinguishing information of the same type from each other. For example, first information may also be referred to as second information, and similarly, the second information may also be referred to as the first information, without departing from the scope of embodiments of the present disclosure. As used herein, the term "if" may be construed to mean "when" or "upon" or "in response to determining" depending on the context.

For the purposes of brevity and ease of understanding, terms "greater than" or "less than" are used herein for indicating size relationships. However, it can be understood by a person skilled in the art that the term “greater than” also covers a meaning of “greater than or equal to”, and the term “less than” also covers a meaning of “less than or equal to”.

Figure 1:
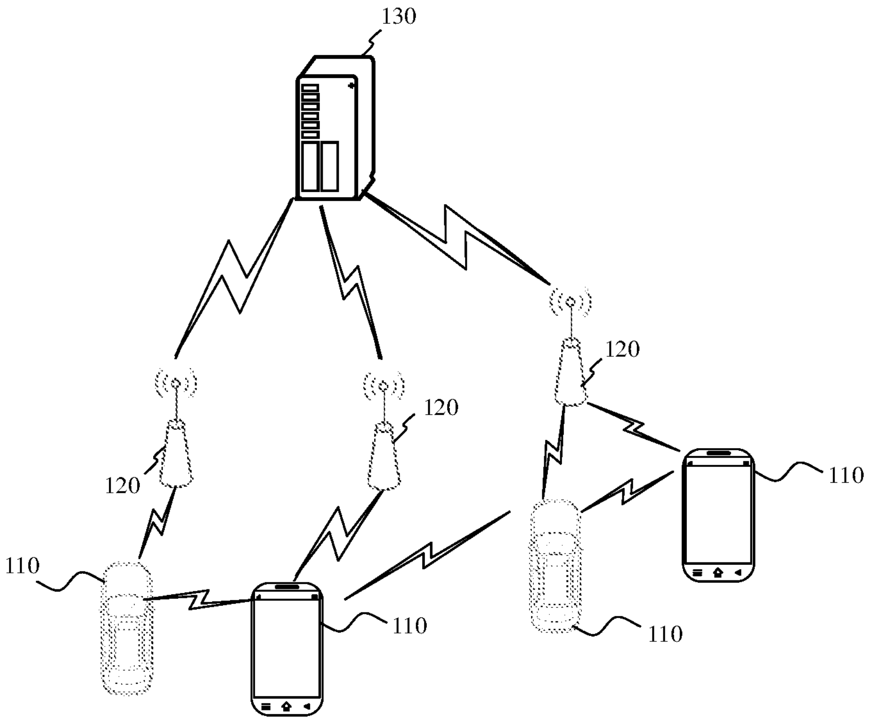
FIG. 1 is a schematic diagram of a wireless communication system according to an illustrative embodiment.

Referring to FIG. 1, which shows a schematic diagram of a wireless communication system according to embodiments of the present disclosure. As shown in FIG. 1, the wireless communication system is a communication system based on a mobile communication technology, and may include several user equipment 110 and several base stations 120.

The user equipment 110 may be a device that provides voice and/or data connectivity to a user. The user equipment 110 can communicate with one or more core networks via a radio access network (RAN). The user equipment 110 may be an Internet of Things user equipment, such as a sensor device, a mobile phone and a computer with an Internet of Things user equipment. For example, the user equipment 110 may be a fixed, portable, pocket-sized, handheld, built-in computer or vehicle-mounted apparatus, such as a station (STA), a subscriber unit, a subscriber station, a mobile station, a mobile, a remote station, an access point, a remote terminal, an access terminal, a user terminal, a user agent, a user device, or a user equipment. Alternatively, the user equipment 110 may be a device of an unmanned aerial vehicle. Alternatively, the user equipment 110 may be a vehicle-mounted device, for example, a vehicle-mounted computer with a wireless communication function, or a wireless user equipment externally connected with a driving computer. Alternatively, the user equipment 110 may be a roadside device, such as a street lamp, a signal lamp or other roadside devices with a wireless communication function.

The base station 120 may be a network side device in the wireless communication system. The wireless communication system may be a 4th generation mobile communication (4G) system, also referred to as a long term evolution (LTE) system. Alternatively, the wireless communication system may be a 5G system, also referred to as a new radio system or a 5G NR system. Alternatively, the wireless communication system may be a next generation system of the 5G system. The access network in the 5G system may be referred to as a new generation-radio access network (NG-RAN).

The base station 120 may be an evolved base station (eNB) used in the 4G system. Alternatively, the base station 120 may be a centralized distributed architecture base station (gNB) used in the 5G system. When the base station 120 adopts the centralized distributed architecture, it usually includes a central unit (CU) and at least two distributed units (DUs). A protocol stack of a packet data convergence protocol (PDCP) layer, a radio link control (RLC) layer and a media access control (MAC) layer is provided in the central unit. A protocol stack of physical (PHY) layers is provided in the distributed unit. The specific implementation of the base station 120 is not limited in embodiments of the present disclosure.

A wireless connection may be established between the base station 120 and the user equipment 110 through a wireless radio. In different embodiments, the wireless radio is a wireless radio based on the 4th generation mobile communication network technology (4G) standard. Alternatively, the wireless radio is a wireless radio based on the 5th generation mobile communication network technology (5G) standard. For example, the wireless radio is a new radio. Alternatively, the wireless radio can also be a wireless radio based on the next generation mobile communication network technology standard of the 5G.

In some embodiments, an end to end (E2E) connection may also be established between a plurality of user equipment 110, for example, a vehicle to vehicle (V2V) communication, a vehicle to infrastructure (V2I) communication and a vehicle to pedestrian (V2P) communication in a vehicle to everything (V2X) communication.

Here, the above user equipment may be considered to be the terminal device in the following embodiments.

In some embodiments, the above wireless communication system may further include a network management device 130.

Several base stations 120 are connected to the network management device 130, respectively. The network management device 130 may be a core network device in the wireless communication system, for example, the network management device 130 may be a mobility management entity (MME) in an evolved packet core (EPC). Alternatively, the network management device may be other core network devices, such as a serving gateway (SGW), a public data network gateway (PGW), a policy and charging rules function (PCRF) or a home subscriber server (HSS). The implementation form of the network management device 130 is not limited in embodiments of the present disclosure.

In order to facilitate the understanding of those skilled in the art, the present disclosure lists a plurality of implementations to clearly illustrate the technical solutions of embodiments of the present disclosure. Of course, those skilled in the art can understand that a plurality of embodiments provided in the present disclosure each can be performed alone or combined with the method as described in any other embodiments of the present disclosure, or can further be performed together with some methods in the related art, which are not limited in the present disclosure.

In order to better understand the technical solutions disclosed in embodiments of the present disclosure, application scenarios of paging monitoring are described.

Figure 2:
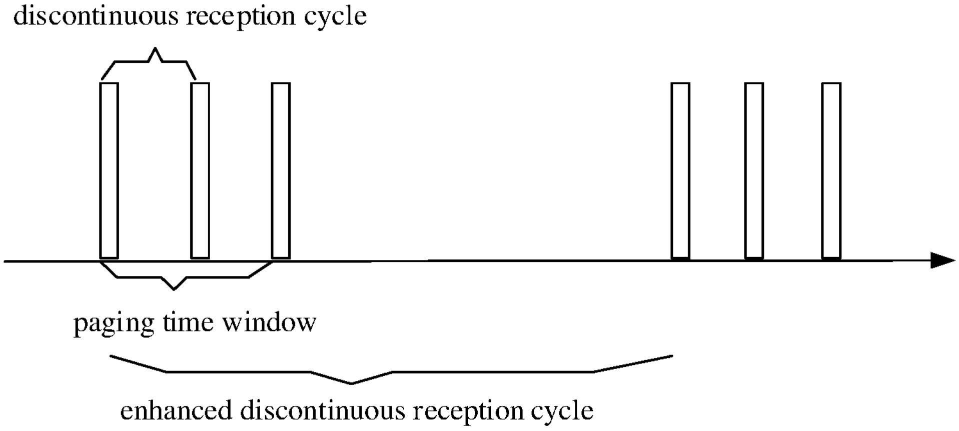
FIG. 2 is a schematic flowchart of a method for paging monitoring according to an illustrative embodiment.

In an embodiment, referring to FIG. 2, a paging time window (PTW) is set in each eDRX cycle. In the PTW, a terminal monitors a paging channel according to a DRX cycle (here, because the time of the DRX cycle is short, it can be considered that the terminal is not dormant, and data is always available), so as to receive downlink data, and the terminal is in a dormant state for the rest of the time. Here, for paging monitoring based on the eDRX, it can be considered that the data is available at any time, but with a large delay. Here, the delay depends on the configuration of an eDRX cycle, so a balance between low power consumption and delay can be achieved by configuring the eDRX cycle.

Figure 3:
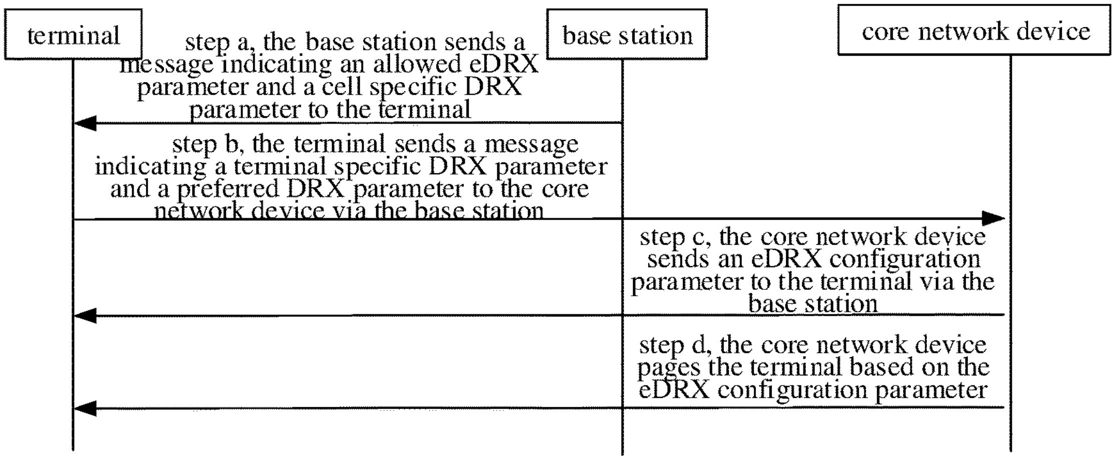
FIG. 3 is a schematic flowchart of a method for paging monitoring according to an illustrative embodiment.

In an embodiment, at least one of the following parameters needs to be negotiated between the terminal and a core network:

1. $T_{eDRX,H}$: eDRX cycle; and
2. L: PTW window length:

Here, referring to FIG. 3, a negotiation process between the terminal and the core network may include steps a-d.

In step a, a base station sends a message indicating an allowed eDRX parameter and a cell specific DRX parameter to the terminal (the message may be a system message).

In step b, the terminal sends a message indicating a terminal specific DRX parameter and a preferred DRX parameter to the core network device via the base station.

In step c, the core network device sends a message indicating an eDRX configuration parameter to the terminal via the base station.

In step d, the core network device pages the terminal based on the eDRX configuration parameter.

Here, the negotiation process may be performed between the terminal and the core network through a non-access stratum message, and the negotiation process is completely transparent to the base station.

In a scenario embodiment, a radio resource control (RRC) inactive state is introduced in the new radio (NR). In such case, the terminal not only needs to receive a paging message from the core network, but also needs to receive a paging message from the radio access network. In an embodiment, the radio access network will allocate a shorter eDRX cycle in an RRC inactive state to the terminal. In an embodiment, the radio access network will also allocate a PTW window length to the terminal. Here, a starting point of the PTW window may be the same as a starting point of a PTW window allocated by the core network device.

In an embodiment, the core network device and the base station allocate two sets of eDRX parameters to the terminal (here, each set of eDRX parameters may include an eDRX cycle and a PTW parameter), i.e., eDRX parameters in an RRC idle state and eDRX parameters in an RRC inactive state, respectively. In an embodiment, only when the eDRX parameters in the RRC idle state are configured, the base station may allocate the eDRX parameters in the RRC inactive state. Here, to the terminal, the base station may explicitly indicate whether the eDRX in the RRC inactive state or the eDRX in the RRC idle state is supported or not. Here, the indication may be carried in a system message. Here, the explicit indication may refer to that an indication message carries an information field indicating whether the eDRX in the RRC inactive state or the eDRX in the RRC idle state is supported or not.

In an embodiment, the eDRX cycle may be greater than or equal to 2.56 s. For example, the eDRX cycle may be 2.56 s, 5.12 s, 10.24 s or greater than 10.24 s, etc.

In an embodiment, under a non-eDRX scenario configuration (here, the non-eDRX scenario may be a DRX scenario), a monitoring behavior of the terminal for the DRX may be as follows.

For a user in an RRC idle state, T=min{UE specific DRX value, default paging cycle}, where the UE specific DRX value is optional: here, the UE specific DRX value is a DRX value specific to the terminal: the default paging cycle is a default paging cycle. It should be noted that if the network does not provide the UE specific DRX value, T=min{UE specific DRX value, default paging cycle}=default paging cycle.

For a user in an RRC inactive state, T=min{UE specific DRX value, default paging cycle, RAN paging cycle}, where the UE specific DRX value is optional. The UE specific DRX value is a DRX value specific to the terminal: the default paging cycle is a default paging cycle; and the RAN paging cycle is a radio access network paging cycle. It should be noted that if the network does not provide the UE specific DRX value, T=min{UE specific DRX value, default paging cycle, RAN paging cycle}=min{default paging cycle, RAN paging cycle}. If the network does not provide the RAN paging cycle, either, the formula becomes T=default paging cycle.

Embodiments of the present disclosure provide a method and apparatus for paging monitoring, a communication device and a storage media.

According to a first aspect of embodiments of the present disclosure, there is provided a method for paging monitoring, which is performed by a terminal and includes: determining, according to a determination result of whether a cell where the terminal in a radio resource control (RRC) unconnected state resides supports an enhanced discontinuous reception (eDRX) in the RRC unconnected state, a paging cycle for the terminal in the RRC unconnected state to perform a paging monitoring in the cell. The terminal is pre-configured with an eDRX parameter for performing the paging monitoring based on the eDRX in the RRC unconnected state.

In an embodiment, determining, according to the determination result of whether the cell where the terminal in the radio resource control (RRC) unconnected state resides supports the enhanced discontinuous reception (eDRX) in the RRC unconnected state, the paging cycle for the terminal in the RRC unconnected state to perform the paging monitoring in the cell includes:

- in response to determining that the cell where the terminal resides supports the eDRX in the RRC unconnected state, determining that the paging cycle is a cycle indicated by the eDRX parameter: or
- in response to determining that the cell where the terminal resides does not support the eDRX in the RRC unconnected state, determining that the paging cycle is a predetermined cycle.

In an embodiment, in response to determining that the cell where the terminal resides does not support the eDRX in an RRC inactive state, a paging time window (PTW) in the RRC inactive state indicated by the eDRX parameter becomes invalid; and/or

- in response to determining that the cell where the terminal resides does not support the eDRX in an RRC inactive state, an eDRX cycle in the RRC inactive state indicated by the eDRX parameter becomes invalid.

In an embodiment, in response to determining that the cell where the terminal resides does not support the eDRX in an RRC idle state, a PTW in the RRC idle state indicated by the eDRX parameter becomes invalid; and/or

- in response to determining that the cell where the terminal resides does not support the eDRX in an RRC idle state, an eDRX cycle in the RRC idle state indicated by the eDRX parameter becomes invalid; and/or
- in response to determining that the cell where the terminal resides does not support the eDRX in an RRC idle state, a PTW in an RRC inactive state indicated by the eDRX parameter becomes invalid; and/or
- in response to determining that the cell where the terminal resides does not support the eDRX in an RRC idle state, an eDRX cycle in an RRC inactive state indicated by the eDRX parameter becomes invalid.

In an embodiment, the method further includes: in response to determining that the cell where the terminal resides does not support the eDRX in the RRC unconnected state, determining the predetermined cycle according to a cycle indicated by the eDRX parameter.

In an embodiment, determining the predetermined cycle according to the cycle indicated by the eDRX parameter includes:

- in response to a cycle indicated by the eDRX parameter in an RRC inactive state being greater than or equal to a first cycle threshold, determining the predetermined cycle in the RRC inactive state according to a radio access paging cycle configured by a network: or
- in response to a cycle indicated by the eDRX parameter in an RRC inactive state being less than or equal to a first cycle threshold, determining the predetermined cycle in the RRC inactive state according to a default radio access paging cycle.

In an embodiment, the cell is a cell not supporting the eDRX in the RRC inactive state; and in response to the cycle indicated by the eDRX parameter in the RRC inactive state being less than or equal to the first cycle threshold, determining the predetermined cycle in the RRC inactive state according to the default radio access paging cycle includes:

in response to a cycle indicated by the eDRX parameter in an RRC idle state configured for the terminal being less than or equal to a second cycle threshold, and the cycle indicated by the eDRX parameter in the RRC inactive state being less than or equal to the first cycle threshold, determining the predetermined cycle according to an eDRX cycle in the idle state and/or the default radio access paging cycle: or in response to a cycle indicated by the eDRX parameter in an RRC idle state configured for the terminal in the RRC inactive state being greater than or equal to a second cycle threshold, and the cycle indicated by the eDRX parameter in the RRC inactive state being less than or equal to the first cycle threshold, determining the predetermined cycle according to a terminal specific DRX value, a default paging cycle and/or the default radio access paging cycle.

In an embodiment, wherein the cell is a cell not supporting the eDRX in the RRC inactive state; and in response to the cycle indicated by the eDRX parameter in the RRC inactive state being greater than or equal to the first cycle threshold, determining the predetermined cycle in the RRC inactive state according to the radio access paging cycle configured by the network includes:

in response to a cycle indicated by the eDRX parameter in an RRC idle state configured for the terminal in the RRC inactive state being greater than or equal to a second cycle threshold, and the cycle indicated by the eDRX parameter in the RRC inactive state being greater than or equal to the first cycle threshold, determining the predetermined cycle according to a terminal specific DRX value, a default paging cycle, and/or the radio access paging cycle configured by the network.

In an embodiment, the cell is a cell not supporting the eDRX in an RRC idle state; and in response to the cycle indicated by the eDRX parameter in the RRC inactive state being less than or equal to the first cycle threshold, determining the predetermined cycle in the RRC inactive state according to the default radio access paging cycle includes:

in response to the terminal in the RRC inactive state being configured such that a cycle indicated by the eDRX parameter in an RRC idle state is less than or equal to a second cycle threshold, and the cycle indicated by the eDRX parameter in the RRC inactive state is less than or equal to the first cycle threshold, determining the predetermined cycle according to a terminal specific DRX value, a default paging cycle and/or the default radio access paging cycle: or in response to a cycle indicated by the eDRX parameter in an RRC idle state configured for the terminal in the RRC inactive state being greater than or equal to a second cycle threshold, and the cycle indicated by the eDRX parameter in the RRC inactive state being less than or equal to the first cycle threshold, determining the predetermined cycle according to a terminal specific DRX value, a default paging cycle and/or the default radio access paging cycle.

In an embodiment, the cell is a cell not supporting the eDRX in an RRC idle state; and in response to the cycle indicated by the eDRX parameter in the RRC inactive state being greater than or equal to the first cycle threshold, determining the predetermined cycle in the RRC inactive state according to the radio access paging cycle configured by the network includes:

in response to a cycle indicated by the eDRX parameter in an RRC idle state configured for the terminal in the RRC inactive state being greater than or equal to a second cycle threshold, and the cycle indicated by the eDRX parameter in the RRC inactive state being greater than or equal to the first cycle threshold, determining the predetermined cycle according to a terminal specific DRX value, a default paging cycle and/or the radio access paging cycle configured by the network.

In an embodiment, determining the predetermined cycle according to the cycle indicated by the eDRX parameter includes:

in response to the terminal in an RRC inactive state being only configured with the eDRX parameter in an RRC idle state, and a cycle indicated by the eDRX parameter in the RRC idle state being less than or equal to a second cycle threshold, determining the predetermined cycle according to a terminal specific DRX value, a default paging cycle and/or a radio access paging cycle configured by a network: or in response to the terminal in an RRC idle state being only configured with the eDRX parameter in the RRC idle state, and a cycle indicated by the eDRX parameter in the RRC idle state being less than or equal to a second cycle threshold, determining the predetermined cycle according to a terminal specific DRX value and/or a default paging cycle: or in response to the terminal in an RRC inactive state being only configured with the eDRX parameter in an RRC idle state, and a cycle indicated by the eDRX parameter in the RRC idle state being greater than or equal to a second cycle threshold, determining the predetermined cycle according to a terminal specific DRX value, a default paging cycle and/or a radio access paging cycle configured by a network: or in response to the terminal in an RRC idle state being only configured with the eDRX parameter in the RRC idle state, and a cycle indicated by the eDRX parameter in the RRC idle state being greater than or equal to a second cycle threshold, determining the predetermined cycle according to a terminal specific DRX value and/or a default paging cycle.

According to a second aspect of embodiments of the present disclosure, there is provided an apparatus for paging monitoring, which includes a determining module. The determining module is configured to determine, according to a determination result of whether a cell where a terminal in a radio resource control (RRC) unconnected state resides supports an enhanced discontinuous reception (eDRX) in the RRC unconnected state, a paging cycle for the terminal in the RRC unconnected state to perform a paging monitoring in the cell. The terminal is pre-configured with an eDRX parameter for performing the paging monitoring based on the eDRX in the RRC unconnected state.

According to a third aspect of embodiments of the present disclosure, there is provided a communication device, which includes: a processor, and a memory for storing instructions executable by the processor. The processor is configured to implement the method as described in any embodiment of the present disclosure by running the executable instructions.

According to a fourth aspect of embodiments of the present disclosure, there is provided a non-transitory computer readable storage medium having stored therein computer-executable programs that, when executed by a processor, enable the method as described in any embodiment of the present disclosure to be implemented.

In embodiments of the present disclosure, according to the determination result of whether a cell where a terminal in a radio resource control (RRC) unconnected state resides supports an enhanced discontinuous reception (eDRX) in the RRC unconnected state, a paging cycle is determined for the terminal in the RRC unconnected state to perform a paging monitoring in the cell, and the terminal is pre-configured with the eDRX parameter for performing the paging monitoring based on the eDRX in the RRC unconnected state. Here, the paging cycle for the terminal in the RRC unconnected state to perform the paging monitoring in the cell may be determined according to the determination result of whether the cell supports the eDRX in the RRC unconnected state, so that the paging cycle may be adapted to the determination result, which can reduce the paging monitoring failure when the cell does not support the eDRX in the RRC unconnected state, and improve the reliability of wireless network communication, as compared with a manner where the paging monitoring is always performed by using the eDRX parameter no matter what cell the terminal moves to.

Figure 4:
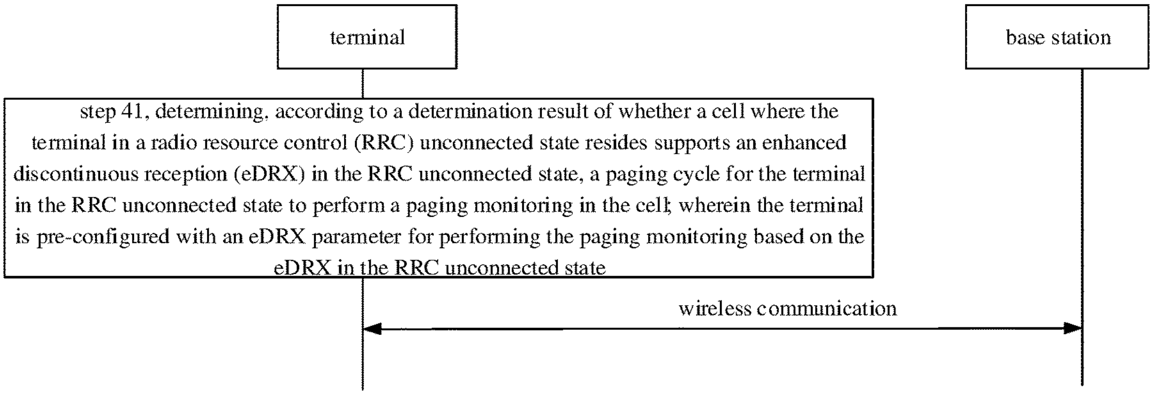
FIG. 4 is a schematic flowchart of a method for paging monitoring according to an illustrative embodiment.

As shown in FIG. 4, embodiments of the present disclosure provide a method for paging monitoring. The method is performed by a terminal, and includes a following step.

In step 41, according to a determination result of whether a cell where the terminal in a radio resource control (RRC) unconnected state resides supports an enhanced discontinuous reception (eDRX) in the RRC unconnected state, a paging cycle is determined for the terminal in the RRC unconnected state to perform a paging monitoring in the cell.

The terminal is pre-configured with an eDRX parameter for performing the paging monitoring based on the eDRX in the RRC unconnected state.

Here, the terminal may be, but is not limited to, a mobile phone, a tablet computer, a wearable device, a vehicle terminal, a road side unit (RSU), a smart home terminal, an industrial sensor device and/or a medical device, etc. For example, the smart home terminal may include a camera, a temperature acquisition device, a brightness acquisition device, and the like.

Here, the base station involved in the present disclosure may be any type of base station, for example, a base station of a third-generation mobile communication (3G) network, a base station of fourth-generation mobile communication (4G) network, a base stations of a fifth-generation mobile communication (5G) network, or other evolved base stations.

Here, the core network device involved in the present disclosure may be a unified data management (UDM) entity, an access control and mobility management function (AMF) entity, or the like.

In embodiments of the present disclosure, a terminal in an RRC unconnected state may be a terminal in other states than an RRC connected state (RRC_CONNECTED), such as a terminal in an RRC inactive state (RRC_INACTIVE) or a terminal in an RRC idle state (RRC_IDLE).

In an embodiment, the network may pre-configure, for the terminal, the eDRX parameter for performing the paging monitoring based on the eDRX in the RRC unconnected state, or the terminal can determine the eDRX parameter according to a communication protocol, or any other feasible manner that enables the terminal to determine the eDRX parameter may be adopted. In embodiments of the present disclosure, these manners all may be referred to as "the terminal being pre-configured with the eDRX parameter". It should be noted that, it is also possible to only define the way where the network may configure the eDRX parameter for the terminal in advance. In response to the terminal being able to determine the eDRX parameter for performing the paging monitoring based on the eDRX in the RRC unconnected state, the paging cycle for the terminal in the RRC unconnected state to perform the paging monitoring in the cell is determined according to the determination result of whether the cell where the terminal in the radio resource control (RRC) unconnected state resides supports the enhanced discontinuous reception (eDRX) in the RRC unconnected state. Here, the eDRX parameter includes at least one of: an eDRX cycle and a PTW. Here, the eDRX parameter may be a parameter for performing the eDRX in an RRC idle state, or a parameter for performing the eDRX in an RRC inactive state.

In an embodiment, the network side may indicate whether the cell where the terminal resides supports the eDRX in the RRC unconnected state or not via a system message. Here, supporting the eDRX in the RRC unconnected state may be supporting the eDRX in an RRC idle state and/or in an RRC inactive state. Not supporting the eDRX in the RRC unconnected state may be not supporting the eDRX in an RRC idle state and/or in an RRC inactive state. It should be noted that whether to support the eDRX in the RRC unconnected state may be determined according to a hardware property of the base station of the cell, a received configuration parameter, or a triggering scenario, which is not limited here.

In an embodiment, the network may pre-configure, for the terminal, the eDRX parameter for performing the paging monitoring based on the eDRX in an RRC idle state and in an RRC inactive state, or the terminal can determine the eDRX parameter according to a communication protocol, or any other feasible manner that enables the terminal to determine the eDRX parameter may be adopted. In embodiments of the present disclosure, these manners all may be referred to as "the terminal being pre-configured with the eDRX parameter". It should be noted that, it is also possible to only define the way where the network may configure the eDRX parameter for the terminal in advance. In response to the terminal being able to determine the eDRX parameter for performing the paging monitoring based on the eDRX in the RRC idle state and in the RRC inactive state, a paging cycle for the terminal in the RRC idle state to perform the paging monitoring in the cell is determined according to a determination result of whether the cell where the terminal in the RRC idle state resides supports the enhanced discontinuous reception (eDRX) in the RRC idle state.

In an embodiment, the network may pre-configure, for the terminal, the eDRX parameter for performing the paging monitoring based on the eDRX in an RRC idle state and in an RRC inactive state, or the terminal can determine the eDRX parameter according to a communication protocol, or any other feasible manner that enables the terminal to determine the eDRX parameter may be adopted. In embodiments of the present disclosure, these manners all may be referred to as "the terminal being pre-configured with the eDRX parameter". It should be noted that, it is also possible to only define the way where the network may configure the eDRX parameter for the terminal in advance. In response to the terminal being able to determine the eDRX parameter for performing the paging monitoring based on the eDRX in the RRC idle state and in the RRC inactive state, a paging cycle for the terminal in the RRC inactive state to perform the paging monitoring in the cell is determined according to a determination result of whether the cell where the terminal in the RRC inactive state resides supports the enhanced discontinuous reception (eDRX) in the RRC inactive state.

In an embodiment, the network may pre-configure, for the terminal, the eDRX parameter for performing the paging monitoring based on the eDRX in an RRC idle state, or the terminal can determine the eDRX parameter according to a communication protocol, or any other feasible manner that enables the terminal to determine the eDRX parameter may be adopted. In embodiments of the present disclosure, these manners all may be referred to as "the terminal being pre-configured with the eDRX parameter". It should be noted that, it is also possible to only define the way where the network may configure the eDRX parameter for the terminal in advance. In response to the terminal being pre-configured with the eDRX parameter for performing the paging monitoring based on the eDRX in the RRC idle state, a paging cycle for the terminal in the RRC idle state to perform the paging monitoring in the cell is determined according to a determination result of whether the cell where the terminal in the RRC idle state resides supports the enhanced discontinuous reception (eDRX) in the RRC idle state.

In an embodiment, the network may pre-configure, for the terminal, the eDRX parameter for performing the paging monitoring based on the eDRX in an RRC inactive state, or the terminal can determine the eDRX parameter according to a communication protocol, or any other feasible manner that enables the terminal to determine the eDRX parameter may be adopted. In embodiments of the present disclosure, these manners all may be referred to as "the terminal being pre-configured with the eDRX parameter". It should be noted that, it is also possible to only define the way where the network may configure the eDRX parameter for the terminal in advance. In response to the terminal being pre-configured with the eDRX parameter for performing the paging monitoring based on the eDRX in the RRC inactive state, a paging cycle for the terminal in the RRC inactive state to perform the paging monitoring in the cell is determined according to a determination result of whether the cell where the terminal in the RRC inactive state resides supports the enhanced discontinuous reception (eDRX) in the RRC inactive state.

In an embodiment, the network may pre-configure, for the terminal, the eDRX parameter for performing the paging monitoring based on the eDRX in the RRC unconnected state, or the terminal can determine the eDRX parameter according to a communication protocol, or any other feasible manner that enables the terminal to determine the eDRX parameter may be adopted. In embodiments of the present disclosure, these manners all may be referred to as "the terminal being pre-configured with the eDRX parameter". It should be noted that, it is also possible to only define the way where the network may configure the eDRX parameter for the terminal in advance. In response to the determination result indicating that the cell supports the eDRX in the RRC unconnected state, the paging cycle is determined to be a cycle indicated by the eDRX parameter. That is, when the cell supports the eDRX in the RRC unconnected state, the terminal may perform the paging monitoring based on the paging cycle indicated by the eDRX parameter. In another embodiment, in response to the determination result indicating that the cell does not support the eDRX in the RRC unconnected state, the paging cycle is determined to be a predetermined cycle. Here, the predetermined cycle may be a cycle determined according to a radio access paging cycle configured by a network or a default radio access paging cycle. That is, when the cell does not support the eDRX in the RRC unconnected state, the terminal no longer performs the paging monitoring based on the cycle indicated by the eDRX parameter, but uses the predetermined cycle to perform the paging monitoring.

In embodiments of the present disclosure, according to the determination result of whether the cell where the terminal in the radio resource control (RRC) unconnected state resides supports the enhanced discontinuous reception (eDRX) in the RRC unconnected state, the paging cycle for the terminal in the RRC unconnected state to perform the paging monitoring in the cell is determined, and the terminal is pre-configured with the eDRX parameter for performing the paging monitoring based on the eDRX in the RRC unconnected state. Here, the paging cycle for the terminal in the RRC unconnected state to perform the paging monitoring in the cell may be determined according to the determination result of whether the cell supports the eDRX in the RRC unconnected state, so that the paging cycle may be adapted to the determination result, which can reduce the paging monitoring failure when the cell does not support the eDRX in the RRC unconnected state, and improve the reliability of wireless network communication, as compared with a manner where the paging monitoring is always performed by using the eDRX parameter no matter what cell the terminal moves to.

It should be noted that, the above solutions are illustrated with reference to the cell where the terminal resides, but it is not the only scenario to which embodiments of the present disclosure are applicable. The terminal may also determine a paging monitoring related parameter during handover based on the same technical solution. For example, regarding the cell handover, the terminal may determine, before, during or after the cell handover, whether the cell to be handed over supports the eDRX in the RRC unconnected state, so as to perform the paging monitoring accordingly. Of course, regarding the cell handover, the terminal may make selections based on the same technical solution. For example, the terminal may determine, when about to perform the cell handover or during the cell handover, whether a candidate cell to be handed over supports the eDRX in the RRC unconnected state, so as to determine a cell to be handed over according to the determination result, and other relevant parameters, if present. It should be noted that the above expressions are also applicable to each embodiment of the present disclosure, and will not be repeated hereafter due to the limited space.

It should be noted that those skilled in the art can understand that the methods according to embodiments of the present disclosure each may be performed alone or together with some other methods as described in embodiments of the present disclosure or those in related art.

Figure 5:
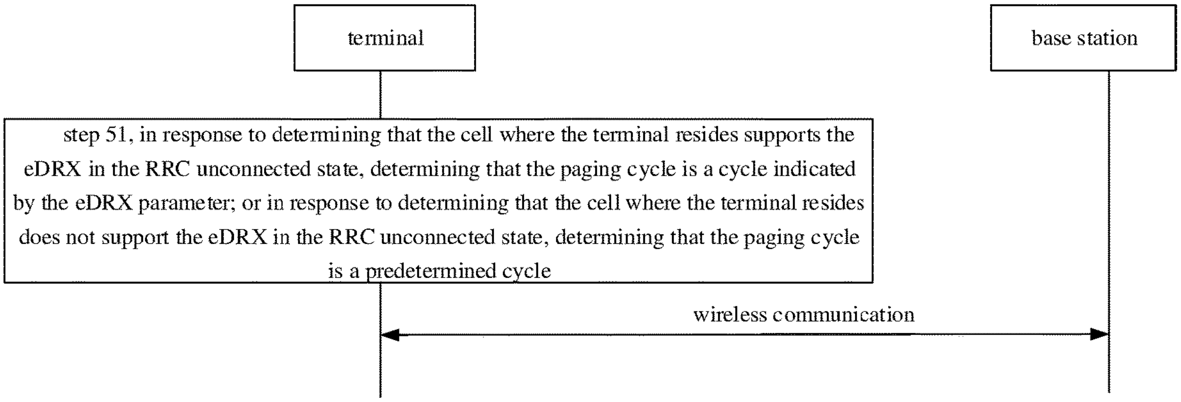
FIG. 5 is a schematic flowchart of a method for paging monitoring according to an illustrative embodiment.

As shown in FIG. 5, embodiments of the present disclosure provide a method for paging monitoring, which is performed by a terminal, and includes a following step.

In step 51, in response to determining that the cell where the terminal resides supports the eDRX in the RRC unconnected state, the paging cycle is determined to be a cycle indicated by the eDRX parameter: or in response to determining that the cell where the terminal resides does not support the eDRX in the RRC unconnected state, the paging cycle is determined to be a predetermined cycle.

It should be noted that the terminal determining whether the cell where the terminal resides supports the eDRX in the RRC unconnected state includes that the terminal in the RRC unconnected state determines that the cell where the terminal resides supports the eDRX in the RRC unconnected state; or the terminal in the RRC unconnected state determines that the cell where the terminal resides does not support the eDRX in the RRC unconnected state. In an embodiment, the network side may indicate whether the cell where the terminal resides supports the eDRX in the RRC unconnected state via a system message. In this case, the terminal may determine whether the cell where the terminal resides supports the eDRX in the RRC unconnected state according to the indication of the system message.

It should be noted that the step performed for determining that the cell where the terminal resides supports the eDRX in the RRC unconnected state is an independent step: at the same time, the step performed for determining that the cell where the terminal resides does not support the eDRX in the RRC unconnected state is also an independent step. Here, these two steps can be performed independently or together. Here, the operation for determining whether the cell supports the eDRX in the RRC unconnected state may be different from the operation of determining whether the cell supports eDRX.

Here, in response to determining that the cell where the terminal resides supports the eDRX in the RRC unconnected state, the paging cycle is determined to be the cycle indicated by the eDRX parameter. Here, since the cell supports the eDRX in the RRC unconnected state, the cycle indicated by the eDRX parameter can be directly used to perform the paging monitoring.

Here, in response to determining that the cell where the terminal resides does not support the eDRX in the RRC unconnected state, the paging cycle is determined to be the predetermined cycle. Since the cell does not support the eDRX in the RRC unconnected state, performing the paging monitoring by using the eDRX in the RRC unconnected state will cause paging monitoring failure. Therefore, the cycle indicated by the eDRX parameter will not be used to perform the paging monitoring, instead, the paging monitoring is performed using the predetermined cycle.

In an embodiment, in response to determining that the cell where the terminal resides does not support the eDRX in the RRC unconnected state, the paging monitoring may be performed based on the predetermined cycle determined according to a radio access paging cycle configured by a network. Alternatively, in response to the determination result indicating that the cell does not support the eDRX in the RRC unconnected state, the paging monitoring may be performed based on the predetermined cycle determined according to a default radio access paging cycle configured by the network. Here, the default radio access paging cycle may be specified by a protocol or configured by the network. The default radio access paging cycle may be the eDRX cycle in the RRC inactive state or the radio access paging cycle configured by the network. For another example, the protocol stipulates that the default radio access paging cycle is 2.56 s. Here, the default radio access paging cycle configured by the network may be used when the eDRX becomes invalid in the RRC inactive state or the eDRX is no longer supported in the RRC inactive state.

It should be noted that those skilled in the art can understand that the methods according to embodiments of the present disclosure each may be performed alone or together with some other methods as described in embodiments of the present disclosure or those in related art.

In an embodiment, in response to determining that the cell where the terminal resides does not support the eDRX in an RRC inactive state, a paging time window (PTW) in the RRC inactive state indicated by the eDRX parameter becomes invalid.

Here, the invalidation of the PTW in the RRC inactive state may mean that the terminal no longer uses the PTW to perform the paging monitoring in the RRC inactive state. In an embodiment, a PTW parameter in the RRC inactive state stored may be deleted.

In an embodiment, in response to determining that the cell where the terminal resides does not support the eDRX in an RRC inactive state, an eDRX cycle in the RRC inactive state indicated by the eDRX parameter becomes invalid.

Here, the invalidation of the eDRX cycle in the RRC inactive state may mean that the terminal no longer uses the eDRX cycle to perform the paging monitoring in the RRC inactive state. In an embodiment, the eDRX cycle in the RRC inactive state stored may be deleted. Here, after the eDRX cycle in the RRC inactive state becomes invalid, it is necessary to use the predetermined cycle to perform the paging monitoring. Here, the predetermined cycle may be determined according to the radio access paging cycle configured by the network or the default radio access paging cycle.

In an embodiment, in response to determining that the cell where the terminal resides does not support the eDRX in an RRC inactive state, the paging time window (PTW) in the RRC inactive state and the eDRX cycle in the RRC inactive state indicated by the eDRX parameter both becomes invalid.

In an embodiment, in response to determining that the cell where the terminal resides does not support the eDRX in an RRC idle state, a PTW in the RRC idle state indicated by the eDRX parameter becomes invalid.

Here, the invalidation of the PTW in the RRC idle state may mean that the terminal no longer uses the PTW to perform the paging monitoring in the RRC idle state. In an embodiment, a PTW parameter in the RRC idle state stored may be deleted.

In an embodiment, in response to determining that the cell where the terminal resides does not support the eDRX in an RRC idle state, an eDRX cycle in the RRC idle state indicated by the eDRX parameter becomes invalid.

Here, the invalidation of the eDRX cycle in the RRC idle state may mean that the terminal no longer uses the eDRX cycle to perform the paging monitoring in the RRC idle state. In an embodiment, the eDRX cycle in the RRC idle state stored may be deleted. Here, after the eDRX cycle in the RRC idle state becomes invalid, it is necessary to use the predetermined cycle to perform the paging monitoring. Here, the predetermined cycle may be determined according to the radio access paging cycle configured by the network or the default radio access paging cycle.

In an embodiment, in response to determining that the cell where the terminal resides does not support the eDRX in an RRC idle state, a PTW in an RRC inactive state indicated by the eDRX parameter becomes invalid.

It should be noted that, in response to determining that the cell does not support the eDRX in the RRC idle state, the cell does not support the eDRX in the RRC inactive state, either. Here, the invalidation of the PTW in the RRC inactive state may mean that the terminal no longer uses the PTW to perform the paging monitoring in the RRC inactive state. In an embodiment, the PTW parameter in the RRC inactive state stored may be deleted.

In an embodiment, in response to determining that the cell where the terminal resides does not support the eDRX in an RRC idle state, an eDRX cycle in an RRC inactive state indicated by the eDRX parameter becomes invalid.

It should be noted that, in response to determining that the cell does not support the eDRX in the RRC idle state, the cell does not support the eDRX in the RRC inactive state, either. Here, the invalidation of the eDRX cycle in the RRC inactive state may mean that the terminal no longer uses the eDRX cycle to perform the paging monitoring in the RRC inactive state. In an embodiment, the eDRX cycle in the RRC inactive state stored may be deleted. Here, after the eDRX cycle in the RRC inactive state becomes invalid, it is necessary to use the predetermined cycle to perform the paging monitoring. Here, the predetermined cycle may be determined according to the radio access paging cycle configured by the network or the default radio access paging cycle.

Figure 6:
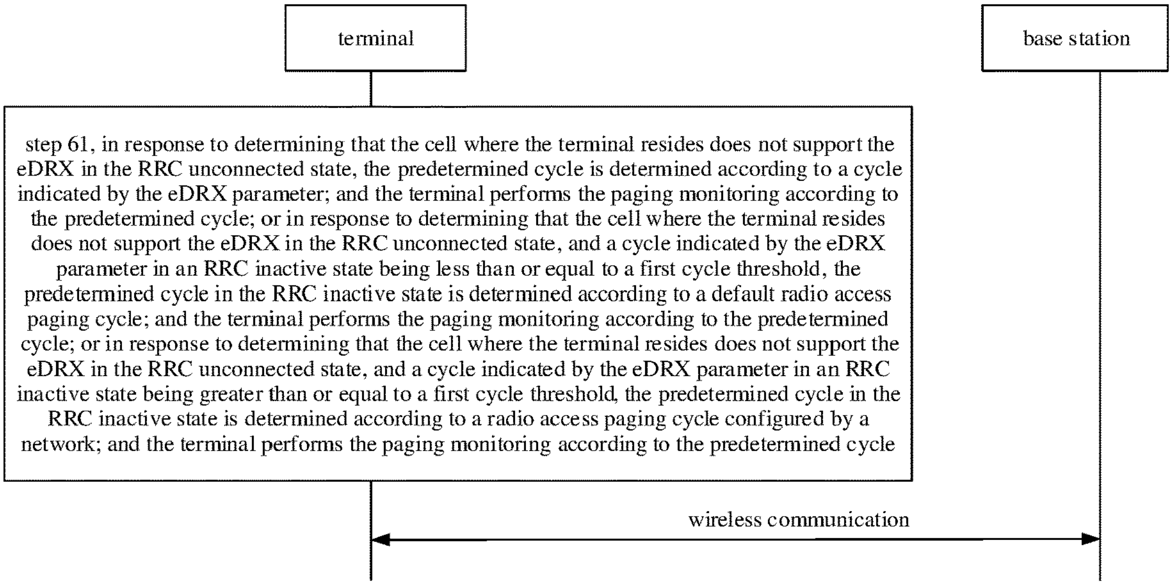
FIG. 6 is a schematic flowchart of a method for paging monitoring according to an illustrative embodiment.

As shown in FIG. 6, embodiments of the present disclosure provide a method for paging monitoring, which is performed by a terminal, and includes a following step.

In step 61, in response to determining that the cell where the terminal resides does not support the eDRX in the RRC unconnected state, the predetermined cycle is determined according to a cycle indicated by the eDRX parameter; and the terminal performs the paging monitoring according to the predetermined cycle: or in response to determining that the cell where the terminal resides does not support the eDRX in the RRC unconnected state, and a cycle indicated by the eDRX parameter in an RRC inactive state being less than or equal to a first cycle threshold, the predetermined cycle in the RRC inactive state is determined according to a default radio access paging cycle; and the terminal performs the paging monitoring according to the predetermined cycle: or in response to determining that the cell where the terminal resides does not support the eDRX in the RRC unconnected state, and a cycle indicated by the eDRX parameter in an RRC inactive state being greater than or equal to a first cycle threshold, the predetermined cycle in the RRC inactive state is determined according to a radio access paging cycle configured by a network; and the terminal performs the paging monitoring according to the predetermined cycle.

It should be noted that those skilled in the art can understand that the methods according to embodiments of the present disclosure each may be performed alone or together with some other methods as described in embodiments of the present disclosure or those in related art.

Figure 7:
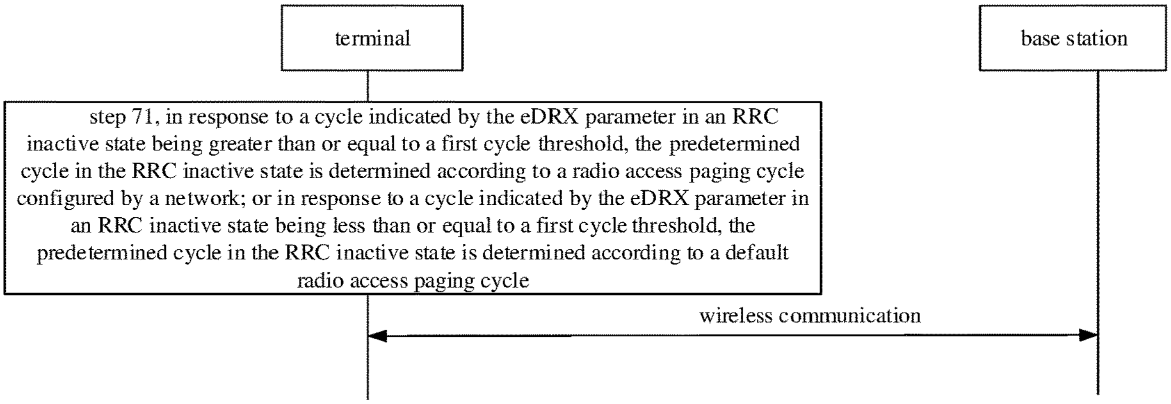
FIG. 7 is a schematic flowchart of a method for paging monitoring according to an illustrative embodiment.

As shown in FIG. 7, embodiments of the present disclosure provide a method for paging monitoring, which is performed by a terminal, and includes a following step.

In step 71, in response to a cycle indicated by the eDRX parameter in an RRC inactive state being greater than or equal to a first cycle threshold, the predetermined cycle in the RRC inactive state is determined according to a radio access paging cycle configured by a network: or in response to a cycle indicated by the eDRX parameter in an RRC inactive state being less than or equal to a first cycle threshold, the predetermined cycle in the RRC inactive state is determined according to a default radio access paging cycle.

For the specific implementation of the step 71, reference may be made to the description of the step 61, which will not be elaborated here.

It should be noted that those skilled in the art can understand that the methods according to embodiments of the present disclosure each may be performed alone or together with some other methods as described in embodiments of the present disclosure or those in related art.

Figure 8:
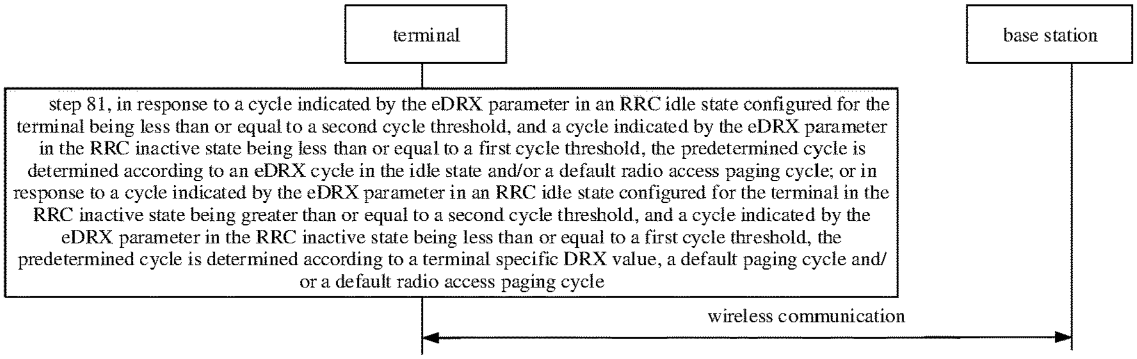
FIG. 8 is a schematic flowchart of a method for paging monitoring according to an illustrative embodiment.

As shown in FIG. 8, embodiments of the present disclosure provide a method for paging monitoring, which is performed by a terminal, and includes a following step.

In step 81, in response to a cycle indicated by the eDRX parameter in an RRC idle state configured for the terminal being less than or equal to a second cycle threshold, and a cycle indicated by the eDRX parameter in the RRC inactive state being less than or equal to a first cycle threshold, the predetermined cycle is determined according to an eDRX cycle in the idle state and/or a default radio access paging cycle: or in response to a cycle indicated by the eDRX parameter in an RRC idle state configured for the terminal in the RRC inactive state being greater than or equal to a second cycle threshold, and a cycle indicated by the eDRX parameter in the RRC inactive state being less than or equal to a first cycle threshold, the predetermined cycle is determined according to a terminal specific DRX value, a default paging cycle and/or a default radio access paging cycle.

In an embodiment, in response to the cycle indicated by the eDRX parameter in the RRC idle state configured for the terminal being less than or equal to value a (here, the value a may be 10.24 s), and the cycle indicated by the eDRX parameter in the RRC inactive state being less than or equal to value b (here, the value b may be 10.24 s), when the terminal moves to a cell that does not support the eDRX in the RRC inactive state, the paging monitoring is performed according to the predetermined cycle T, where T=min{eDRX cycle in the idle state, default radio access paging cycle}. Here, the default radio access paging cycle may be configured by the network or specified in a predetermined protocol. As an embodiment, the protocol stipulates that the value of the default radio access paging cycle is 2.56 s. As an embodiment, the default radio access paging cycle specified in the protocol is the cycle indicated by the eDRX parameter in the RRC inactive state, and at this time, the cycle is less than or equal to the value b (here, the value b may be 10.24 s).

In an embodiment, in response to the cycle indicated by the eDRX parameter in the RRC idle state configured for the terminal in the RRC inactive state being greater than or equal to value a (here, the value a may be 10.24 s), and the cycle indicated by the eDRX parameter in the RRC inactive state being less than or equal to value b (here, the value b may be 10.24 s), when the terminal moves to a cell that does not support the eDRX in the RRC inactive state, the paging monitoring is performed according to the predetermined cycle T within the PTW window, where T=min{terminal specific DRX value, default paging cycle, default radio access paging cycle}. Here, the paging monitoring may be performed according to the default radio access paging cycle outside the PTW window. Here, the default radio access paging cycle may be configured by the network or specified in a predetermined protocol. As an embodiment, the protocol stipulates that the value of the default radio access paging cycle is 2.56 s. As an embodiment, the default radio access paging cycle specified in the protocol is the cycle indicated by the eDRX parameter in the RRC inactive state, and at this time, the cycle is less than or equal to the value b (here, the value b may be 10.24 s).

It should be noted that those skilled in the art can understand that in the above solutions, some parameters in the formula part T may not be configured, but are optional parameters.

It should be noted that those skilled in the art can understand that the methods according to embodiments of the present disclosure each may be performed alone or together with some other methods as described in embodiments of the present disclosure or those in related art.

Figure 9:
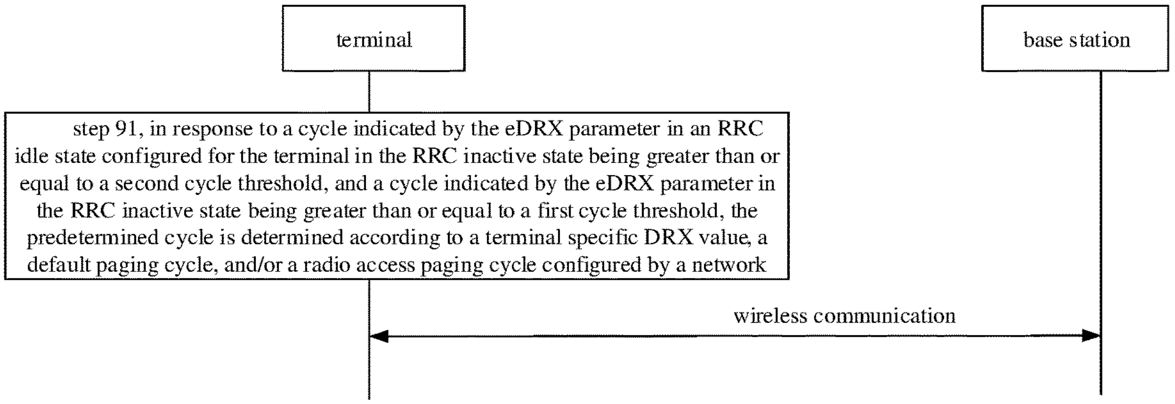
FIG. 9 is a schematic flowchart of a method for paging monitoring according to an illustrative embodiment.

As shown in FIG. 9, embodiments of the present disclosure provide a method for paging monitoring, which is performed by a terminal, and includes a following step.

In step 91, in response to a cycle indicated by the eDRX parameter in an RRC idle state configured for the terminal in the RRC inactive state being greater than or equal to a second cycle threshold, and a cycle indicated by the eDRX parameter in the RRC inactive state being greater than or equal to a first cycle threshold, the predetermined cycle is determined according to a terminal specific DRX value, a default paging cycle, and/or a radio access paging cycle configured by a network.

In an embodiment, in response to the cycle indicated by the eDRX cycle parameter in the RRC idle state configured for the terminal in the RRC inactive state being greater than or equal to value a (here, the value a may be 10.24 s), and the eDRX cycle in the RRC inactive state being greater than or equal to value b (here, the value b may be 10.24 s), when the terminal moves to a cell that does not support the eDRX in the RRC inactive state, the eDRX cycle in the RRC inactive state will no longer take effect, and the PTW configured by the eDRX in the RRC inactive state will no longer take effect. Here, within the PTW window, the paging monitoring will be performed according to T, where T=min{terminal specific DRX value, default paging cycle, radio paging cycle configured by the network}. Here, outside the PTW window, the paging monitoring will be performed according to the radio paging cycle configured by the network. It should be noted that those skilled in the art can understand that in the above solutions, some parameters in the formula part T may not be configured, but are optional parameters.

It should be noted that those skilled in the art can understand that the methods according to embodiments of the present disclosure each may be performed alone or together with some other methods as described in embodiments of the present disclosure or those in related art.

Figure 10:
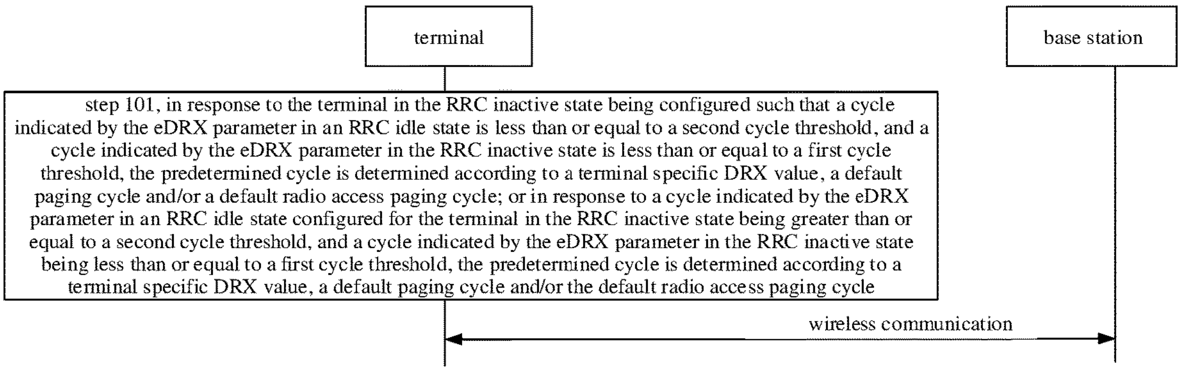
FIG. 10 is a schematic flowchart of a method for paging monitoring according to an illustrative embodiment.

As shown in FIG. 10, embodiments of the present disclosure provide a method for paging monitoring, which is performed by a terminal, and includes a following step.

In step 101, in response to the terminal in the RRC inactive state being configured such that a cycle indicated by the eDRX parameter in an RRC idle state is less than or equal to a second cycle threshold, and a cycle indicated by the eDRX parameter in the RRC inactive state is less than or equal to a first cycle threshold, the predetermined cycle is determined according to a terminal specific DRX value, a default paging cycle and/or a default radio access paging cycle: or in response to a cycle indicated by the eDRX parameter in an RRC idle state configured for the terminal in the RRC inactive state being greater than or equal to a second cycle threshold, and a cycle indicated by the eDRX parameter in the RRC inactive state being less than or equal to a first cycle threshold, the predetermined cycle is determined according to a terminal specific DRX value, a default paging cycle and/or the default radio access paging cycle.

In an embodiment, in response to the cycle indicated by the eDRX parameter in the RRC idle state configured for the terminal in the RRC inactive state being less than or equal to value a (here, the value a may be 10.24 s), and the cycle indicated by the eDRX parameter in the RRC inactive state being less than or equal to value b (here, the value b may be 10.24 s), when the terminal moves to a cell that does not support the eDRX in the RRC idle state, the paging monitoring is performed according to the predetermined cycle T, where T=min{terminal specific DRX value, default paging cycle, default radio access paging cycle}, where the default radio paging cycle may be configured by the network or specified in a predetermined protocol. It may also be the eDRX cycle in the RRC inactive state.

In an embodiment, in response to the cycle indicated by the eDRX parameter in the RRC idle state configured for the terminal in the RRC inactive state being greater than or equal to value a (here, the value a may be 10.24 s), and the cycle indicated by the eDRX parameter in the RRC inactive state being less than or equal to value b (here, the value b may be 10.24 s), when the terminal moves to a cell that does not support the eDRX in the RRC idle state, the PTW of the eDRX in the RRC idle state becomes invalid, and the paging monitoring is performed according to the predetermined cycle T, where T=min{terminal specific DRX value, default paging cycle, default radio access paging cycle}, where the default radio access paging cycle may be configured by the network or specified in a predetermined protocol, and the default radio access paging cycle may be the eDRX cycle in the RRC inactive state. It should be noted that those skilled in the art can understand that in the above solutions, some parameters in the formula part T may not be configured, but are optional parameters.

It should be noted that those skilled in the art can understand that the methods according to embodiments of the present disclosure each may be performed alone or together with some other methods as described in embodiments of the present disclosure or those in related art.

Figure 11:
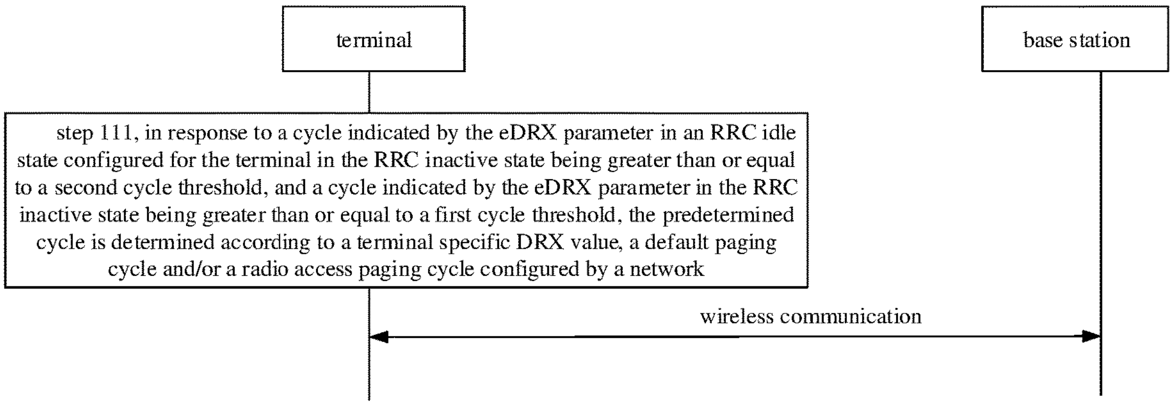
FIG. 11 is a schematic flowchart of a method for paging monitoring according to an illustrative embodiment.

As shown in FIG. 11, embodiments of the present disclosure provide a method for paging monitoring, which is performed by a terminal, and includes a following step.

In step 111, in response to a cycle indicated by the eDRX parameter in an RRC idle state configured for the terminal in the RRC inactive state being greater than or equal to a second cycle threshold, and a cycle indicated by the eDRX parameter in the RRC inactive state being greater than or equal to a first cycle threshold, the predetermined cycle is determined according to a terminal specific DRX value, a default paging cycle and/or a radio access paging cycle configured by a network.

In an embodiment, in response to the cycle indicated by the eDRX parameter in the RRC idle state configured for the terminal in the RRC inactive state being greater than or equal to value a (here, the value a may be 10.24 s), and the cycle indicated by the eDRX parameter in the RRC inactive state being greater than or equal to value b (here, the value b may be 10.24 s), when the terminal moves to a cell that does not support the eDRX in the RRC idle state, the PTW of the eDRX in the RRC idle state and the PTW of the eDRX in the RRC inactive state both become invalid, the paging monitoring is performed according to the predetermined cycle T, where T=min{terminal specific DRX value, default paging cycle, radio access paging cycle configured by the network}. It should be noted that those skilled in the art can understand that some parameters in the formula part T may not be configured, but are optional parameters.

It should be noted that those skilled in the art can understand that the methods according to embodiments of the present disclosure each may be performed alone or together with some other methods as described in embodiments of the present disclosure or those in related art.

Figure 12:
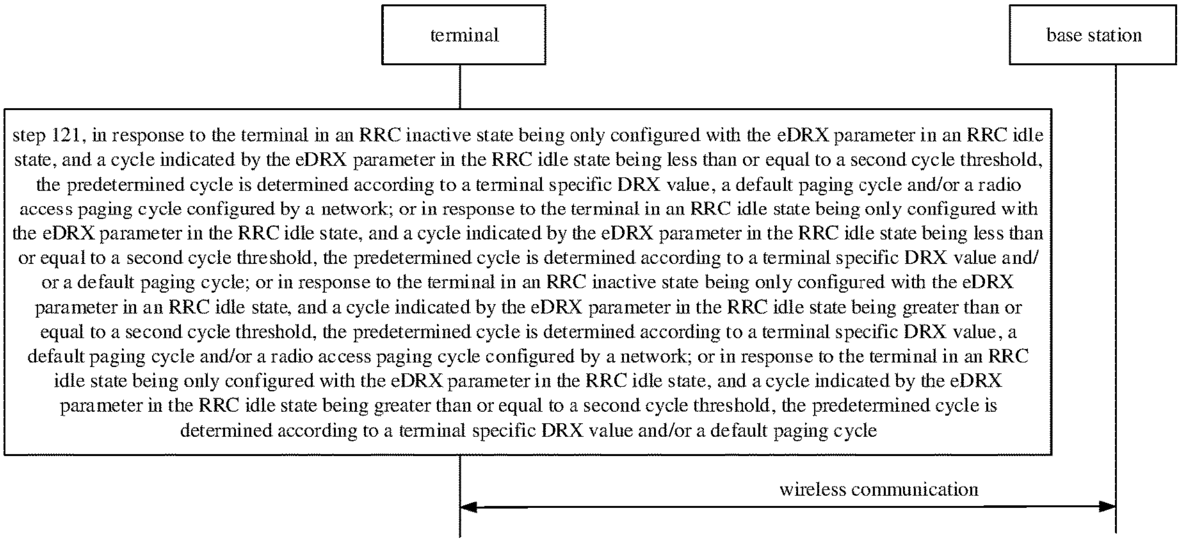
FIG. 12 is a schematic flowchart of a method for paging monitoring according to an illustrative embodiment.

As shown in FIG. 12, embodiments of the present disclosure provide a method for paging monitoring, which is performed by a terminal, and includes a following step.

In step 121, in response to the terminal in an RRC inactive state being only configured with the eDRX parameter in an RRC idle state, and a cycle indicated by the eDRX parameter in the RRC idle state being less than or equal to a second cycle threshold, the predetermined cycle is determined according to a terminal specific DRX value, a default paging cycle and/or a radio access paging cycle configured by a network: or in response to the terminal in an RRC idle state being only configured with the eDRX parameter in the RRC idle state, and a cycle indicated by the eDRX parameter in the RRC idle state being less than or equal to a second cycle threshold, the predetermined cycle is determined according to a terminal specific DRX value and/or a default paging cycle: or in response to the terminal in an RRC inactive state being only configured with the eDRX parameter in an RRC idle state, and a cycle indicated by the eDRX parameter in the RRC idle state being greater than or equal to a second cycle threshold, the predetermined cycle is determined according to a terminal specific DRX value, a default paging cycle and/or a radio access paging cycle configured by a network: or in response to the terminal in an RRC idle state being only configured with the eDRX parameter in the RRC idle state, and a cycle indicated by the eDRX parameter in the RRC idle state being greater than or equal to a second cycle threshold, the predetermined cycle is determined according to a terminal specific DRX value and/or a default paging cycle.

In an embodiment, in response to the terminal in the RRC inactive state being only configured with the eDRX parameter in the RRC idle state, and the cycle indicated by the eDRX parameter in the RRC idle state being less than or equal to value a (here, the value a may be 10.24 s), when the terminal moves to a cell that does not support the eDRX in the RRC idle state, the paging monitoring is performed according to the predetermined cycle T, where T=min{terminal specific DRX value, default paging cycle, radio access paging cycle configured by a network}, where the terminal specific DRX value is optional.

In an embodiment, in response to the terminal in the RRC idle state being only configured with the eDRX parameter in the RRC idle state, and the cycle indicated by the eDRX parameter in the RRC idle state being less than or equal to value a (here, the value a may be 10.24 s), when the terminal moves to a cell that does not support the eDRX in the RRC idle state, the paging monitoring is performed according to the predetermined cycle T, where T=min{specific DRX value, default paging cycle}, where the terminal specific DRX value is optional.

In an embodiment, in response to the terminal in an RRC inactive state being only configured with the eDRX parameter in the RRC idle state, and the cycle indicated by the eDRX parameter in the RRC idle state being greater than or equal to value a (here, the value a may be 10.24 s), when the terminal moves to a cell that does not support the eDRX in the RRC idle state, the PTW of the eDRX in the RRC idle state becomes invalid, and the paging monitoring is performed according to the predetermined cycle T, where T=min{terminal specific DRX value, default paging Period, radio access paging cycle configured by the network}, where the terminal specific DRX value is optional.

In an embodiment, in response to the terminal in the RRC idle state being only configured with the eDRX parameter in the RRC idle state, and the cycle indicated by the eDRX parameter in the RRC idle state being greater than or equal to value a (here, the value a may be 10.24 s), when the terminal moves to a cell that does not support the eDRX in the RRC idle state, the PTW of the eDRX in the RRC idle state becomes invalid, and the terminal performs the paging monitoring according to the predetermined cycle T, where T=min{specific DRX value, default paging cycle}, where the terminal specific DRX value is optional.

It should be noted that those skilled in the art can understand that the methods according to embodiments of the present disclosure each may be performed alone or together with some other methods as described in embodiments of the present disclosure or those in related art.

Figure 13:
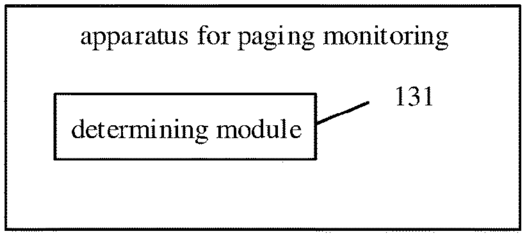
FIG. 13 is a schematic diagram of an apparatus for paging monitoring according to an illustrative embodiment.

As shown in FIG. 13, embodiments of the present disclosure provide an apparatus for paging monitoring. The apparatus includes a determining module 131.

The determining module 131 is configured to determine, according to a determination result of whether a cell where a terminal in a radio resource control (RRC) unconnected state resides supports an enhanced discontinuous reception (eDRX) in the RRC unconnected state, a paging cycle for the terminal in the RRC unconnected state to perform a paging monitoring in the cell.

The terminal is pre-configured with an eDRX parameter for performing the paging monitoring based on the eDRX in the RRC unconnected state.

In an embodiment, the determining module 131 is further configured to:

- in response to determining that the cell where the terminal resides supports the eDRX in the RRC unconnected state, determine that the paging cycle is a cycle indicated by the eDRX parameter; or
- in response to determining that the cell where the terminal resides does not support the eDRX in the RRC unconnected state, determine that the paging cycle is a predetermined cycle.

In an embodiment, the determining module 131 is further configured such that in response to determining that the cell where the terminal resides does not support the eDRX in an RRC inactive state, a paging time window (PTW) in the RRC inactive state indicated by the eDRX parameter becomes invalid; and/or

- in response to determining that the cell where the terminal resides does not support the eDRX in an RRC inactive state, an eDRX cycle in the RRC inactive state indicated by the eDRX parameter becomes invalid.

In an embodiment, the determining module 131 is further configured such that in response to determining that the cell where the terminal resides does not support the eDRX in an RRC idle state, a PTW in the RRC idle state indicated by the eDRX parameter becomes invalid; and/or

- in response to determining that the cell where the terminal resides does not support the eDRX in an RRC idle state, an eDRX cycle in the RRC idle state indicated by the eDRX parameter becomes invalid; and/or
- in response to determining that the cell where the terminal resides does not support the eDRX in an RRC idle state, a PTW in an RRC inactive state indicated by the eDRX parameter becomes invalid; and/or
- in response to determining that the cell where the terminal resides does not support the eDRX in an RRC idle state, an eDRX cycle in an RRC inactive state indicated by the eDRX parameter becomes invalid.

In an embodiment, the determining module 131 is further configured to: in response to determining that the cell where the terminal resides does not support the eDRX in the RRC unconnected state, determine the predetermined cycle according to a cycle indicated by the eDRX parameter.

In an embodiment, the determining module is further configured to:

- in response to a cycle indicated by the eDRX parameter in an RRC inactive state being greater than or equal to a first cycle threshold, determine the predetermined cycle in the RRC inactive state according to a radio access paging cycle configured by a network: or in response to a cycle indicated by the eDRX parameter in an RRC inactive state being less than or equal to a first cycle threshold, determine the predetermined cycle in the RRC inactive state according to a default radio access paging cycle.

In an embodiment, the determining module 131 is further configured to:

in response to a cycle indicated by the eDRX parameter in an RRC idle state configured for the terminal being less than or equal to a second cycle threshold, and the cycle indicated by the eDRX parameter in the RRC inactive state being less than or equal to the first cycle threshold, determine the predetermined cycle according to an eDRX cycle in the idle state and/or the default radio access paging cycle; or in response to a cycle indicated by the eDRX parameter in an RRC idle state configured for the terminal in the RRC inactive state being greater than or equal to a second cycle threshold, and the cycle indicated by the eDRX parameter in the RRC inactive state being less than or equal to the first cycle threshold, determine the predetermined cycle according to a terminal specific DRX value, a default paging cycle and/or the default radio access paging cycle.

In an embodiment, the determining module 131 is further configured to: in response to a cycle indicated by the eDRX parameter in an RRC idle state configured for the terminal in the RRC inactive state being greater than or equal to a second cycle threshold, and the cycle indicated by the eDRX parameter in the RRC inactive state being greater than or equal to the first cycle threshold, determine the predetermined cycle according to a terminal specific DRX value, a default paging cycle, and/or the radio access paging cycle configured by the network.

In an embodiment, the determining module 131 is further configured to:

in response to the terminal in the RRC inactive state being configured such that a cycle indicated by the eDRX parameter in an RRC idle state is less than or equal to a second cycle threshold, and the cycle indicated by the eDRX parameter in the RRC inactive state is less than or equal to the first cycle threshold, determine the predetermined cycle according to a terminal specific DRX value, a default paging cycle and/or the default radio access paging cycle: or in response to a cycle indicated by the eDRX parameter in an RRC idle state configured for the terminal in the RRC inactive state being greater than or equal to a second cycle threshold, and the cycle indicated by the eDRX parameter in the RRC inactive state being less than or equal to the first cycle threshold, determine the predetermined cycle according to a terminal specific DRX value, a default paging cycle and/or the default radio access paging cycle.

In an embodiment, the determining module 131 is further configured to: in response to a cycle indicated by the eDRX parameter in an RRC idle state configured for the terminal in the RRC inactive state being greater than or equal to a second cycle threshold, and the cycle indicated by the eDRX parameter in the RRC inactive state being greater than or equal to the first cycle threshold, determine the predetermined cycle according to a terminal specific DRX value, a default paging cycle and/or the radio access paging cycle configured by the network.

In an embodiment, the determining module 131 is further configured to:

in response to the terminal in an RRC inactive state being only configured with the eDRX parameter in an RRC idle state, and a cycle indicated by the eDRX parameter in the RRC idle state being less than or equal to a second cycle threshold, determine the predetermined cycle according to a terminal specific DRX value, a default paging cycle and/or a radio access paging cycle configured by a network; or in response to the terminal in an RRC idle state being only configured with the eDRX parameter in the RRC idle state, and a cycle indicated by the eDRX parameter in the RRC idle state being less than or equal to a second cycle threshold, determine the predetermined cycle according to a terminal specific DRX value and/or a default paging cycle: or in response to the terminal in an RRC inactive state being only configured with the eDRX parameter in an RRC idle state, and a cycle indicated by the eDRX parameter in the RRC idle state being greater than or equal to a second cycle threshold, determine the predetermined cycle according to a terminal specific DRX value, a default paging cycle and/or a radio access paging cycle configured by a network: or in response to the terminal in an RRC idle state being only configured with the eDRX parameter in the RRC idle state, and a cycle indicated by the eDRX parameter in the RRC idle state being greater than or equal to a second cycle threshold, determine the predetermined cycle according to a terminal specific DRX value and/or a default paging cycle.

It should be noted that those skilled in the art can understand that the methods according to embodiments of the present disclosure each may be performed alone or together with some other methods as described in embodiments of the present disclosure or those in related art.

Embodiments of the present disclosure provide a communication device, which includes: a processor, and a memory for storing instructions executable by the processor. The processor is configured to implement the method as described in any embodiment of the present disclosure by running the executable instructions.

The processor may include various types of storage media, which are non-transitory computer storage media that can continue to memorize information stored therein when the communication device is powered off.

The processor may be connected to the memory through a bus or the like, to read executable programs stored in the memory.

Embodiments of the present disclosure further provide a computer storage medium having stored therein computer-executable programs that, when executed by a processor, enable the method as described in any embodiment of the present disclosure to be implemented.

With respect to the apparatus in the above embodiments, the specific manners of individual modules therein for performing operations have been described in detail in the embodiments regarding the methods, which will not be elaborated herein.

Figure 14:
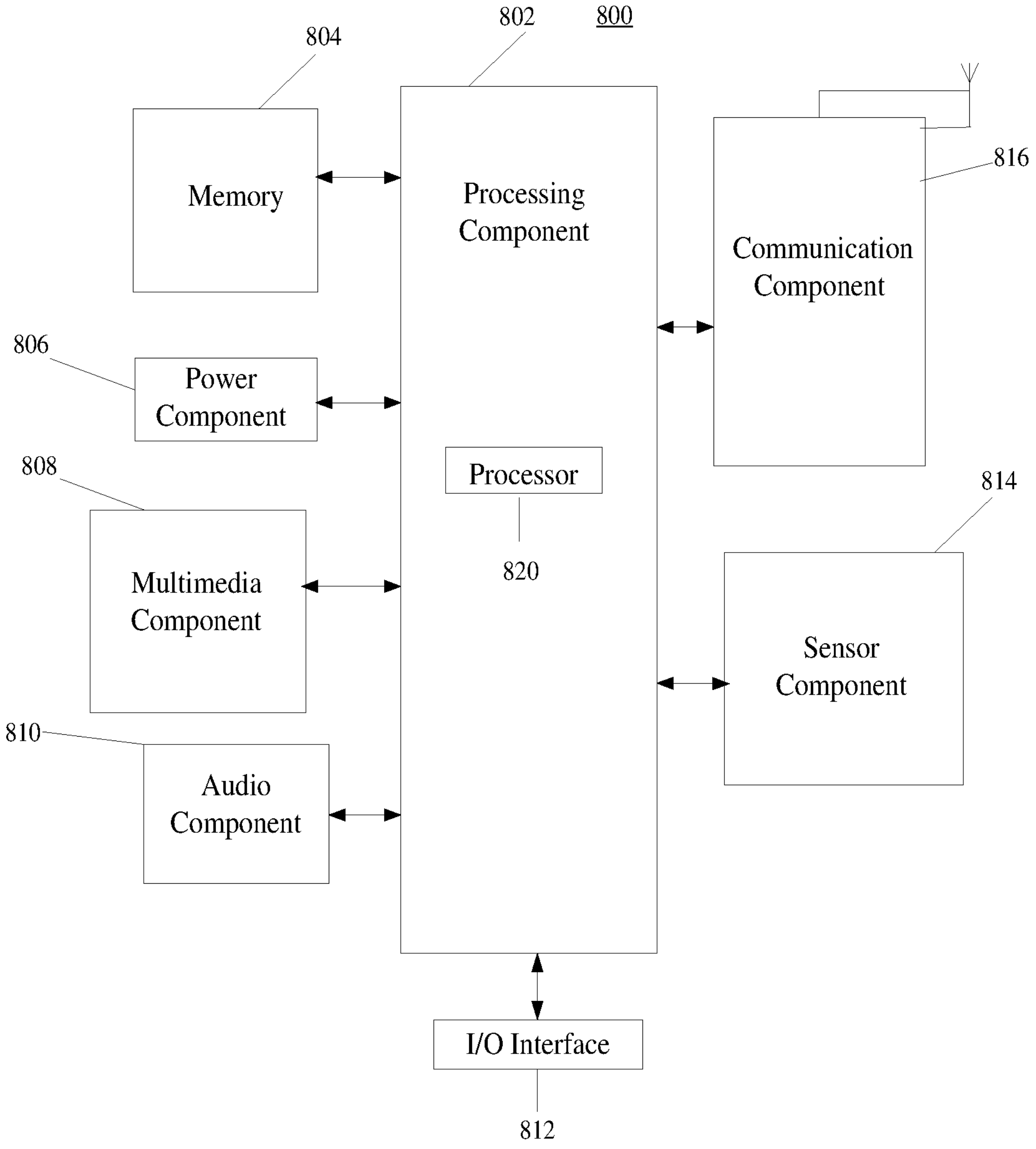
FIG. 14 is a schematic diagram of a terminal according to an illustrative embodiment.

As shown in FIG. 14, an embodiment of the present disclosure provides a structure of a terminal.

Referring to the terminal 800 shown in FIG. 14, embodiments of the present disclosure provide a terminal 800, and the terminal 800 may be a mobile phone, a computer, a digital broadcast terminal, a messaging device, a game console, a tablet device, a medical device, a fitness device, a personal digital assistant, or the like.

Referring to FIG. 14, the terminal 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the terminal 800, such as the operations associated with display, phone calls, data communications, camera operations, and recording operations. The processing component 802 can include one or more processors 820 to execute instructions to perform all or some of the steps in the above-described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the terminal 800. Examples of such data include instructions for any applications or methods operated on the terminal 800, contact data, phonebook data, messages, pictures, videos, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the terminal 800. The power component 806 may include a power management system, one or more power sources, and any other components associated with the generation, management, and distribution of power in the terminal 800.

The multimedia component 808 includes a screen providing an output interface between the terminal 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and/or the rear camera may receive an external multimedia datum while the terminal 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone (MIC) configured to receive an external audio signal when the terminal 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as keyboards, click wheels, buttons, and the like. The buttons may include, but are not limited to, a home button, a volume button, a starting button, and a locking button.

The sensor component 814 includes one or more sensors to provide status assessments of various aspects of the terminal 800. For instance, the sensor component 814 may detect an open/closed status of the terminal 800, relative positioning of components, e.g., the display and the keypad, of the terminal 800, a change in position of the terminal 800 or a component of the terminal 800, a presence or absence of user contact with the terminal 800, an orientation or an acceleration/deceleration of the terminal 800, and a change in temperature of the terminal 800. The sensor component 814 may include a proximity sensor configured to detect the presence of nearby objects without any physical contact. The sensor component 814 may further include a light sensor, such as a CMOS or CCD image sensor, for use in imaging applications. In some embodiments, the sensor component 814 may further include an accelerometer sensor, a gyroscope sensor, a magnetic sensor, a pressure sensor, or a temperature sensor.

The communication component 816 is configured to facilitate communication, wired or wireless, between the terminal 800 and other devices. The terminal 800 can access a wireless network based on a communication standard, such as Wi-Fi, 2G, or 3G, 4G LTE, 5G NR, or a combination thereof. In an illustrative embodiment, the communication component 816 receives a broadcast signal or broadcast associated information from an external broadcast management system via a broadcast channel. In an illustrative embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an illustrative embodiment, the terminal 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic elements, for performing the above methods.

In an illustrative embodiment, there is also provided a non-transitory computer readable storage medium including instructions, such as included in the memory 804, executable by the processor 820 in the terminal 800, for completing the above-mentioned methods. For example, the non-transitory computer-readable storage medium may be a ROM, a random access memory (RAM), a CD-ROM, a magnetic tape, a floppy disc, an optical data storage device, and the like.

Figure 15:
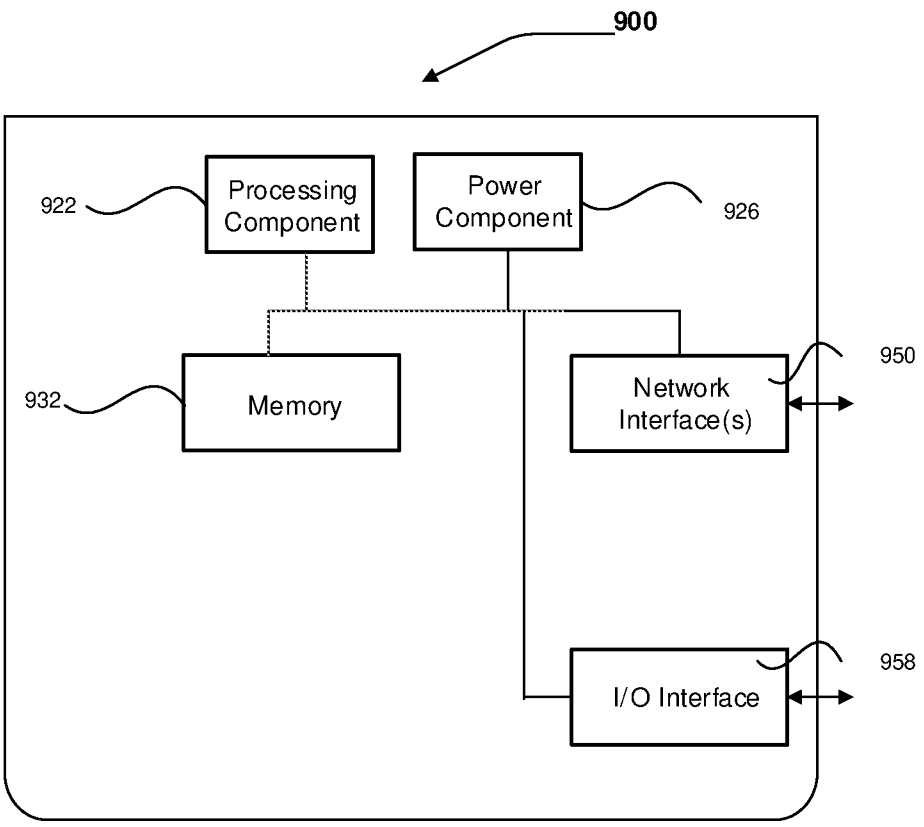
FIG. 15 is a block diagram of a base station according to an illustrative embodiment.

As shown in FIG. 15, an embodiment of the present disclosure shows a structure of a base station. For example, the base station 900 may be provided as a network side device. Referring to FIG. 15, the base station 900 includes a processing component 922 which further includes one or more processors, and a memory resource represented by a memory 932 for storing instructions executable by the processing component 922, such as application programs. The application program stored in the memory 932 may include one or more modules each corresponding to a set of instructions. In addition, the processing component 922 is configured to execute instructions, so as to perform any of the aforementioned methods applied to the base station.

The base station 900 may further include a power component 926 configured to perform power management of the base station 900, a wired or wireless network interface 950 configured to connect the base station 900 to a network, and an input-output (I/O) interface 958. The base station 900 can operate based on an operating system stored in the memory 932, such as Windows Server™, Mac OS X™, Unix™, Linux™, FreeBSD™, or the like.

Other embodiments of the present disclosure will be apparent to those skilled in the art from consideration of the specification and practice of the invention disclosed here. The present disclosure is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for paging monitoring, performed by a terminal, wherein the terminal in a radio resource control (RRC) inactive state (RRC INACTIVE) is configured with at least one of an enhanced discontinuous reception (eDRX) parameter configured by a base station or an eDRX parameter configured by a core network, and the method comprises:

determining that a cell where the terminal in the RRC INACTIVE resides does not use eDRX in the RRC INACTIVE; and determining that the eDRX parameter configured by the base station is not used.

2. The method according to claim 1, further comprising:

determining that the cell where the terminal in the RRC INACTIVE resides does not use the eDRX in the RRC INACTIVE, and determining a predetermined cycle as a paging cycle for the terminal to perform the paging monitoring in the cell.

3. The method according to claim 2, wherein determining the predetermined cycle comprises:

determining that a cycle indicated by the eDRX parameter configured by the base station is greater than or equal to a first cycle threshold, and determining the predetermined cycle in the RRC INACTIVE according to a radio access paging cycle configured by the base station; or determining that a cycle indicated by the eDRX parameter configured by the base station is less than or equal to a first cycle threshold, and determining the predetermined cycle in the RRC INACTIVE according to a radio access paging cycle configured by the base station.

4. The method according to claim 3, wherein the cell does not use the eDRX in the RRC_INACTIVE; it is determined that the cycle indicated by the eDRX parameter configured by the base station is less than or equal to the first cycle threshold; and determining the predetermined cycle in the RRC INACTIVE according to the radio access paging cycle configured by the base station comprises:

determining that a cycle indicated by the eDRX parameter configured by the core network for the terminal in the RRC INACTIVE is less than or equal to a second cycle threshold, and the cycle indicated by the eDRX parameter configured by the base station is less than or equal to the first cycle threshold, and determining the predetermined cycle according to at least one of a cycle indicated by the eDRX parameter configured by the core network or the radio access paging cycle configured by the base station; or determining that a cycle indicated by the eDRX parameter configured by the core network for the terminal in the RRC INACTIVE is greater than or equal to a second cycle threshold, and the cycle indicated by the eDRX parameter configured by the base station is less than or equal to the first cycle threshold, and determining the predetermined cycle according to at least one of a terminal specific DRX value, a default paging cycle or the radio access paging cycle configured by the base station, or wherein the cell does not use the eDRX in the RRC INACTIVE; it is determined that the cycle indicated by the eDRX parameter configured by the base station is greater than or equal to the first cycle threshold, and determining the predetermined cycle in the RRC_INACTIVE according to the radio access paging cycle configured by the base station comprises:

determining that a cycle indicated by the eDRX parameter configured by the core network for the terminal in the RRC INACTIVE is greater than or equal to a second cycle threshold, and the cycle indicated by the eDRX parameter configured by the base station is greater than or equal to the first cycle threshold, and determining the predetermined cycle according to at least one of a terminal specific DRX value, a default paging cycle, or the radio access paging cycle configured by the base station.

5. The method according to claim 3, wherein the cell does not use the eDRX in an RRC idle state (RRC IDLE); and determining the predetermined cycle in the RRC INACTIVE according to the radio access paging cycle configured by the base station comprises:

determining that a cycle indicated by the eDRX parameter configured by the core network for the terminal in the RRC INACTIVE is less than or equal to a second cycle threshold, and the cycle indicated by the eDRX parameter configured by the base station is less than or equal to the first cycle threshold, and determining the predetermined cycle according to at least one of a terminal specific DRX value, a default paging cycle or the radio access paging cycle configured by the base station; or determining that a cycle indicated by the eDRX parameter configured by the core network for the terminal in the RRC INACTIVE is greater than or equal to a second cycle threshold, and the cycle indicated by the eDRX parameter configured by the base station is less than or equal to the first cycle threshold, and determining the predetermined cycle according to at least one of a terminal specific DRX value, a default paging cycle or the radio access paging cycle configured by the base station, or wherein the cell does not use the eDRX in the RRC IDLE; it is determined that the cycle indicated by the eDRX parameter configured by the base station is greater than or equal to the first cycle threshold; and determining the predetermined cycle in the RRC INACTIVE according to the radio access paging cycle configured by the base station comprises:

determining that a cycle indicated by the eDRX parameter configured by the core network for the terminal in the RRC INACTIVE is greater than or equal to a second cycle threshold, and the cycle indicated by the eDRX parameter configured by the base station is greater than or equal to the first cycle threshold, and determining the predetermined cycle according to at least one of a terminal specific DRX value, a default paging cycle or the radio access paging cycle configured by the base station.

6. The method according to claim 2, wherein determining the predetermined cycle comprises:

determining that the terminal in the RRC_INACTIVE is only configured with the eDRX parameter configured by the core network, and a cycle indicated by the eDRX parameter configured by the core network is less than or equal to a second cycle threshold, and determining the predetermined cycle according to at least one of a terminal specific DRX value, a default paging cycle or a radio access paging cycle configured by the base station;

determining that the terminal in an RRC idle state (RRC IDLE) is only configured with the eDRX parameter configured by the core network, and a cycle indicated by the eDRX parameter configured by the core network is less than or equal to a second cycle threshold, and determining the predetermined cycle according to at least one of a terminal specific DRX value or a default paging cycle;

determining that the terminal in the RRC INACTIVE is only configured with the eDRX parameter configured by the core network, and a cycle indicated by the eDRX parameter configured by the core network is greater than or equal to a second cycle threshold, and determining the predetermined cycle according to at least one of a terminal specific DRX value, a default paging cycle or a radio access paging cycle configured by the base station; or determining that the terminal in the RRC IDLE is only configured with the eDRX parameter configured by the core network, and a cycle indicated by the eDRX parameter configured by the core network is greater than or equal to a second cycle threshold, and determining the predetermined cycle according to at least one of a terminal specific DRX value or a default paging cycle.

7. The method according to claim 1, wherein the cell where the terminal in the RRC INACTIVE resides does not use the eDRX in the RRC INACTIVE, and at least one of a paging time window (PTW) in the RRC INACTIVE or an eDRX cycle in the RRC INACTIVE indicated by the eDRX parameter configured by the base station is not used.

8. The method according to claim 1, wherein the cell where the terminal in the RRC INACTIVE resides does not use the eDRX in an RRC idle state (RRC IDLE), and at least one of a PTW in the RRC IDLE indicated by the eDRX parameter configured by the core network, an eDRX cycle in the RRC IDLE indicated by the eDRX parameter configured by the core network, a PTW in the RRC INACTIVE indicated by the eDRX parameter configured by the base station, or an eDRX cycle in the RRC INACTIVE indicated by the eDRX parameter configured by the base station is not used.

9. The method according to claim 1, further comprising:

in response to a cycle indicated by the eDRX parameter configured by the core network for the terminal in the RRC INACTIVE being less than or equal to a second cycle threshold, and a cycle indicated by the eDRX parameter configured by the base station for the terminal in the RRC INACTIVE being less than or equal to a first cycle threshold, and when the terminal moves to a cell that does not use the eDRX in the RRC INACTIVE, determining that the cycle indicated by the eDRX parameter configured by the base station is not used, and performing paging monitoring according to a predetermined cycle, wherein the predetermined cycle is a minimum value of the cycle indicated by the eDRX parameter configured by the core network and a radio access paging cycle configured by the base station; or in response to a cycle indicated by the eDRX parameter configured by the core network for the terminal in the RRC INACTIVE being greater than or equal to a second cycle threshold, and a cycle indicated by the eDRX parameter configured by the base station for the terminal in the RRC INACTIVE being greater than, less than or equal to a first cycle threshold, and when the terminal moves to a cell that does not use the eDRX in the RRC INACTIVE, determining that the cycle indicated by the eDRX parameter configured by the base station is not used, and performing paging monitoring according to a predetermined cycle within a paging time window (PTW), and performing paging monitoring according to a radio access paging cycle configured by the base station outside the PTW, wherein the predetermined cycle is a minimum value of a terminal specific DRX value, a default paging cycle, and the radio access paging cycle configured by the base station.

10. A terminal, comprising:

a memory; and a processor, connected to the memory, wherein the terminal in a radio resource control (RRC) inactive state (RRC INACTIVE) is configured with at least one of an enhanced discontinuous reception (eDRX) parameter configured by a base station or an eDRX parameter configured by a core network; and the processor is configured to:

determine that a cell where the terminal in the RRC INACTIVE resides does not use eDRX in the RRC INACTIVE; and determine that the eDRX parameter configured by the base station is not used.

11. The terminal according to claim 10, wherein the processor is further configured to:

determine that the cell where the terminal in the RRC INACTIVE resides does not use the eDRX in the RRC INACTIVE, and determine a predetermined cycle as a paging cycle for the terminal to perform the paging monitoring in the cell.

12. The terminal according to claim 11, wherein the processor is further configured to:

determine that a cycle indicated by the eDRX parameter configured by the base station is greater than or equal to a first cycle threshold, and determine the predetermined cycle in the RRC INACTIVE according to a radio access paging cycle configured by the base station;

determine that a cycle indicated by the eDRX parameter configured by the base station is less than or equal to a first cycle threshold, and determine the predetermined cycle in the RRC INACTIVE according to a radio access paging cycle configured by the base station;

determine that the terminal in the RRC INACTIVE is only configured with the eDRX parameter configured by the core network, and a cycle indicated by the eDRX parameter configured by the core network is less than or equal to a second cycle threshold, and determine the predetermined cycle according to at least one of a terminal specific DRX value, a default paging cycle or a radio access paging cycle configured by the base station;

determine that the terminal in an RRC idle state (RRC IDLE) is only configured with the eDRX parameter configured by the core network, and a cycle indicated by the eDRX parameter configured by the core network is less than or equal to a second cycle threshold, and determine the predetermined cycle according to at least one of a terminal specific DRX value or a default paging cycle;

determine that the terminal in the RRC INACTIVE is only configured with the eDRX parameter configured by the core network, and a cycle indicated by the eDRX parameter configured by the core network is greater than or equal to a second cycle threshold, and determine the predetermined cycle according to at least one of a terminal specific DRX value, a default paging cycle or a radio access paging cycle configured by the base station; or determine that the terminal in the RRC IDLE is only configured with the eDRX parameter configured by the core network, and a cycle indicated by the eDRX parameter configured by the core network is greater than or equal to a second cycle threshold, and determine the predetermined cycle according to at least one of a terminal specific DRX value or a default paging cycle.

13. The terminal according to claim 10, wherein the cell where the terminal in the RRC INACTIVE resides does not use the eDRX in the RRC INACTIVE, and at least one of a paging time window (PTW) in the RRC INACTIVE or an eDRX cycle in the RRC INACTIVE indicated by the eDRX parameter configured by the base station is not used.

14. The terminal according to claim 10, wherein the cell where the terminal in the RRC INACTIVE resides does not use the eDRX in an RRC idle state (RRC IDLE), and at least one of a PTW in the RRC IDLE indicated by the eDRX parameter configured by the core network, an eDRX cycle in the RRC IDLE indicated by the eDRX parameter configured by the core network, a PTW in the RRC INACTIVE indicated by the eDRX parameter configured by the base station, or an eDRX cycle in the RRC INACTIVE indicated by the eDRX parameter configured by the base station becomes invalid is not used.

15. The terminal according to claim 10, wherein the processor is further configured to:

in response to a cycle indicated by the eDRX parameter configured by the core network for the terminal in the RRC INACTIVE being less than or equal to a second cycle threshold, and a cycle indicated by the eDRX parameter configured by the base station for the terminal in the RRC INACTIVE being less than or equal to a first cycle threshold, and when the terminal moves to a cell that does not use the eDRX in the RRC INACTIVE, determine that the cycle indicated by the eDRX parameter configured by the base station invalid is not used, and perform paging monitoring according to a predetermined cycle, wherein the predetermined cycle is a minimum value of the cycle indicated by the eDRX parameter configured by the core network and a radio access paging cycle configured by the base station; or in response to a cycle indicated by the eDRX parameter configured by the core network for the terminal in the RRC INACTIVE being greater than or equal to a second cycle threshold, and a cycle indicated by the eDRX parameter configured by the base station for the terminal in the RRC INACTIVE being greater than, less than or equal to a first cycle threshold, and when the terminal moves to a cell that does not use the eDRX in the RRC INACTIVE, determine that the cycle indicated by the eDRX parameter configured by the base station is not used, and perform paging monitoring according to a predetermined cycle within a paging time window (PTW), and perform paging monitoring according to a radio access paging cycle configured by the base station outside the PTW, wherein the predetermined cycle is a minimum value of a terminal specific DRX value, a default paging cycle, and the radio access paging cycle configured by the base station.

16. A non-transitory computer-readable storage medium having stored therein computer-executable instructions that, when executed by a processor of a terminal, cause the terminal to perform a method for paging monitoring, the method comprising:

determining that a cell where the terminal in a radio resource control (RRC) inactive state (RRC INACTIVE) resides does not use enhanced discontinuous reception (eDRX) in the RRC INACTIVE, wherein the terminal in the RRC INACTIVE is configured with at least one of an eDRX parameter configured by a base station or an eDRX parameter configured by a core network; and determining that the eDRX parameter configured by the base station is not used.

17. The non-transitory computer-readable storage medium according to claim 16, wherein the method further comprises:

determining that the cell where the terminal in the RRC INACTIVE resides does not use the eDRX in the RRC INACTIVE, and determining a predetermined cycle as a paging cycle for the terminal to perform the paging monitoring in the cell.

18. The non-transitory computer-readable storage medium according to claim 17, wherein the method further comprises:

determining that a cycle indicated by the eDRX parameter configured by the base station is greater than or equal to a first cycle threshold, and determining the predetermined cycle in the RRC INACTIVE according to a radio access paging cycle configured by the base station;

determining that a cycle indicated by the eDRX parameter configured by the base station is less than or equal to a first cycle threshold, and determining the predetermined cycle in the RRC INACTIVE according to a radio access paging cycle configured by the base station;

determining that the terminal in the RRC INACTIVE is only configured with the eDRX parameter configured by the core network, and a cycle indicated by the eDRX parameter configured by the core network is less than or equal to a second cycle threshold, and determining the predetermined cycle according to at least one of a terminal specific DRX value, a default paging cycle or a radio access paging cycle configured by the base station;

determining that the terminal in an RRC idle state (RRC IDLE) is only configured with the eDRX parameter configured by the core network, and a cycle indicated by the eDRX parameter configured by the core network is less than or equal to a second cycle threshold, and determining the predetermined cycle according to at least one of a terminal specific DRX value or a default paging cycle;

determining that the terminal in the RRC INACTIVE is only configured with the eDRX parameter configured by the core network, and a cycle indicated by the eDRX parameter configured by the core network is greater than or equal to a second cycle threshold, and determining the predetermined cycle according to at least one of a terminal specific DRX value, a default paging cycle or a radio access paging cycle configured by the base station; or determining that the terminal in the RRC IDLE is only configured with the eDRX parameter configured by the core network, and a cycle indicated by the eDRX parameter configured by the core network is greater than or equal to a second cycle threshold, and determining the predetermined cycle according to at least one of a terminal specific DRX value or a default paging cycle.

19. The non-transitory computer-readable storage medium according to claim 16, wherein the method further comprises:

in response to a cycle indicated by the eDRX parameter configured by the core network for the terminal in the RRC INACTIVE being less than or equal to a second cycle threshold, and a cycle indicated by the eDRX parameter configured by the base station for the terminal in the RRC_INACTIVE being less than or equal to a first cycle threshold, and when the terminal moves to a cell that does not use the eDRX in the RRC INACTIVE, determining that the cycle indicated by the eDRX parameter configured by the base station is not used, and performing paging monitoring according to a predetermined cycle, wherein the predetermined cycle is a minimum value of the cycle indicated by the eDRX parameter configured by the core network and a radio access paging cycle configured by the base station; or in response to a cycle indicated by the eDRX parameter configured by the core network for the terminal in the RRC INACTIVE being greater than or equal to a second cycle threshold, and a cycle indicated by the eDRX parameter configured by the base station for the terminal in the RRC INACTIVE being greater than, less than or equal to a first cycle threshold, and when the terminal moves to a cell that does not use the eDRX in the RRC INACTIVE, determining that the cycle indicated by the eDRX parameter configured by the base station is not used, and performing paging monitoring according to a predetermined cycle within a paging time window (PTW), and perform paging monitoring according to a radio access paging cycle configured by the base station outside the PTW, wherein the predetermined cycle is a minimum value of a terminal specific DRX value, a default paging cycle, and the radio access paging cycle configured by the base station.

20. The non-transitory computer-readable storage medium according to claim 16, wherein the cell where the terminal in the RRC INACTIVE resides does not use the eDRX in the RRC INACTIVE, and at least one of a paging time window (PTW) in the RRC INACTIVE or an eDRX cycle in the RRC INACTIVE indicated by the eDRX parameter configured by the base station is not used; or wherein the cell where the terminal in the RRC INACTIVE resides does not use the eDRX in an RRC idle state (RRC IDLE), and at least one of a PTW in the RRC IDLE indicated by the eDRX parameter configured by the core network, an eDRX cycle in the RRC IDLE indicated by the eDRX parameter configured by the core network, a PTW in the RRC INACTIVE indicated by the eDRX parameter configured by the base station, or an eDRX cycle in the RRC INACTIVE indicated by the eDRX parameter configured by the base station is not used.

* * * * *